(12) United States Patent
Kato

(10) Patent No.: US 12,132,360 B2
(45) Date of Patent: Oct. 29, 2024

(54) ELECTRIC WORK MACHINE

(71) Applicant: MAKITA CORPORATION, Anjo (JP)

(72) Inventor: Itsuku Kato, Anjo (JP)

(73) Assignee: MAKITA CORPORATION, Anjo (JP)

( * ) Notice: Subject to any disclaimer, the term of this patent is extended or adjusted under 35 U.S.C. 154(b) by 287 days.

(21) Appl. No.: 17/894,281

(22) Filed: Aug. 24, 2022

(65) Prior Publication Data

US 2023/0061013 A1 Mar. 2, 2023

(30) Foreign Application Priority Data

Aug. 27, 2021 (JP) ................................. 2021-139285

(51) Int. Cl.
| | |
|---|---|
| H02P 1/00 | (2006.01) |
| A01G 20/47 | (2018.01) |
| H02J 7/00 | (2006.01) |
| H02K 11/33 | (2016.01) |
| H02P 3/00 | (2006.01) |
| H02P 5/00 | (2016.01) |
| H02P 6/08 | (2016.01) |
| H02P 6/20 | (2016.01) |
| H02P 6/24 | (2006.01) |

(52) U.S. Cl.
CPC ............ *H02K 11/33* (2016.01); *A01G 20/47* (2018.02); *H02J 7/0024* (2013.01); *H02J 7/0044* (2013.01); *H02J 7/0045* (2013.01); *H02P 6/08* (2013.01); *H02P 6/20* (2013.01); *H02P 6/24* (2013.01)

(58) Field of Classification Search
CPC ....... H02K 11/33; A01G 20/47; H02J 7/0023; H02J 7/0044; H02J 7/0045
USPC ......................................................... 318/801
See application file for complete search history.

(56) References Cited

U.S. PATENT DOCUMENTS

| | | | |
|---|---|---|---|
| 5,642,030 A * | 6/1997 | Seelye ................. | H02J 7/0031 320/101 |
| 2014/0056738 A1* | 2/2014 | Takahashi ............ | A47L 9/2831 417/411 |
| 2016/0049636 A1* | 2/2016 | Takano ................ | H01M 10/48 429/61 |
| 2020/0067337 A1 | 2/2020 | Nakamoto et al. | |

FOREIGN PATENT DOCUMENTS

| | | |
|---|---|---|
| JP | 2019-073995 A | 5/2019 |
| JP | 2020-031486 A | 2/2020 |
| WO | 2020/031889 A1 | 2/2020 |

* cited by examiner

*Primary Examiner* — Erick D Glass
(74) *Attorney, Agent, or Firm* — Oliff PLC

(57) ABSTRACT

An electric work machine includes a motor, a first connector, a second connector, an energizing circuit, a manual switch, and a controller. The controller electrically disconnects the first connector from the motor based on a first voltage value below a first threshold at a start of motor rotation. The controller maintains an electrical connection of the first connector to the motor based on the first voltage value below the first threshold and equal to or greater than a second threshold during discharge of the first battery.

8 Claims, 20 Drawing Sheets

| SPEED MODE | 1ST THRESHOLD | 2ND THRESHOLD |
|---|---|---|
| Lv0 | 28V | 23V |
| Lv1 | 29V | 23V |
| Lv2 | 29V | 23V |
| Lv3 | 29.5V | 23V |
| Lv4 | 29.5V | 24V |
| Lv5 | 30V | 24V |
| Lv6 | 30V | 24V |
| Lv7 | 30.5V | 24.5V |
| Lv8 | 30.5V | 24.5V |
| Lv9 | 31V | 24.5V |
| Lv10 | 32V | 24.5V |

SMALL OUTPUT ↕ LARGE OUTPUT

FIG. 6

| SPEED MODE | TARGET DUTY RATIO | INCREASED DUTY RATIO | |
|---|---|---|---|
| | | NORMAL | SWITCHING |
| Lv0 | 50% | 0.5% | 0.02% |
| Lv1 | 55% | 0.5% | 0.02% |
| Lv2 | 60% | 0.5% | 0.05% |
| Lv3 | 65% | 0.5% | 0.05% |
| Lv4 | 70% | 0.5% | 0.10% |
| Lv5 | 75% | 0.5% | 0.10% |
| Lv6 | 80% | 0.5% | 0.15% |
| Lv7 | 85% | 0.5% | 0.15% |
| Lv8 | 90% | 0.5% | 0.20% |
| Lv9 | 95% | 0.5% | 0.20% |
| Lv10 | 100% | 0.5% | 0.25% |

FIG. 9

| SPEED MODE | TARGET ROTATIONAL SPEED | INCREASED ROTATIONAL SPEED | |
|---|---|---|---|
| | | NORMAL | SWITCHING |
| Lv0 | 18000rpm | 50rpm | 4rpm |
| Lv1 | 19000rpm | 50rpm | 8rpm |
| Lv2 | 20000rpm | 50rpm | 8rpm |
| Lv3 | 21000rpm | 50rpm | 10rpm |
| Lv4 | 23000rpm | 50rpm | 10rpm |
| Lv5 | 25000rpm | 50rpm | 15rpm |
| Lv6 | 27000rpm | 50rpm | 15rpm |
| Lv7 | 29000rpm | 50rpm | 20rpm |
| Lv8 | 31000rpm | 50rpm | 20rpm |
| Lv9 | 33000rpm | 50rpm | 20rpm |
| Lv10 | 35000rpm | 50rpm | 25rpm |

FIG. 16

| COMMANDED ROTATIONAL SPEED | REFERENCE DUTY RATIO |
|---|---|
| 2000 | 5% |
| 5500 | 10% |
| 7000 | 15% |
| 9500 | 20% |
| 11000 | 26% |
| 13000 | 32% |
| 16000 | 38% |
| 19000 | 44% |
| 21000 | 52% |
| 23500 | 60% |
| 26000 | 70% |
| 28000 | 80% |
| 30000 | 90% |
| 33000 | 95% |
| 35000 | 100% |

FIG. 17

ELECTRIC WORK MACHINE

CROSS-REFERENCE TO RELATED APPLICATIONS

This application claims the benefit of Japanese Patent Application No. 2021-139285 filed on Aug. 27, 2021 with the Japan Patent Office, the entire disclosure of which is incorporated herein by reference.

BACKGROUND

The present disclosure relates to an electric work machine.

Japanese Unexamined Patent Application Publication No. 2020-31486 discloses a voltage supplier that includes a first battery pack, a second battery pack, a first switching circuit, and a second switching circuit, and is configured to supply electric power of one of the first battery pack or the second battery pack to a motor. The first switching circuit is arranged on a first supply path from the first battery pack to a blower, and configured to interrupt or establish a path between the first battery pack and the motor. The second switching circuit is arranged on a second supply path from the second battery pack to the motor, and configured to interrupt or establish a path between the second battery pack and the motor.

SUMMARY

In the above-described voltage supplier, during discharge of the first battery pack, discharge of the first battery pack is stopped in response to a voltage value of the first battery pack falling below a threshold, and discharge of the second battery pack is started. If the voltage value of the first battery pack at a start of rotation of the motor is close to the threshold, the voltage value of the first battery pack may drop immediately after a start of discharge of the first battery pack and fall below the threshold. In such a case, the battery pack electrically connected to the motor is changed immediately after a start of rotation of the motor. This makes a user feel uncomfortable.

It is desirable that an electric work machine according to one aspect of the present disclosure can inhibit a change of a battery electrically connected to a motor immediately after a start of rotation of the motor.

An electric work machine according to one aspect of the present disclosure includes a motor, a first connector, a second connector, an energizing circuit, a drive switch, and a controller. The first connector is to be connected to a first battery having a first voltage value. The second connector is to be connected to a second battery having a second voltage value. The energizing circuit receives a first control signal to thereby selectively and electrically connect the first connector or the second connector to the motor. The drive switch is manually operated by a user to command to start or stop rotation of the motor. The controller detects the first voltage value and the second voltage value. The controller receives a first command via the drive switch to start rotation of the motor. The controller outputs the first control signal to the energizing circuit based on the first voltage value below the first threshold to electrically disconnect the first connector from the motor. The controller outputs the first control signal to the energizing circuit based on the first voltage value equal to or greater than the first threshold to electrically connect the first connector to the motor. The controller maintains an electrical connection of the first connector to the motor based on the first voltage value below the first threshold and equal to or greater than a second threshold during discharge of the first battery. The second threshold is less than the first threshold. The controller outputs the first control signal to the energizing circuit based on the first voltage value having fallen below the second threshold during discharge of the first battery so as to (i) electrically disconnect the first connector from the motor and (ii) electrically connect the second connector to the motor.

The above-described electric work machine has the first threshold and the second threshold. The first threshold is used for determining whether the first battery is allowed to discharge. The second threshold is used for determining whether to stop discharge of the first battery. Thus, an energizing battery is not changed even if the first voltage value falls below the first threshold immediately after a start of rotation of the motor. Therefore, it is possible to inhibit a change of the battery electrically connected to the motor immediately after a start of rotation of the motor.

BRIEF DESCRIPTION OF THE DRAWINGS

Example embodiments of the present disclosure will be described hereinafter with reference to the accompanying drawings, in which:

FIG. 6 is a table of values for a first threshold and values for a second threshold associated with speed modes according to the first embodiment;

FIG. 9 is a table of target duty ratios and increased duty ratios associated with speed modes according to the first embodiment;

FIG. 16 is a table of target rotational speeds and increased rotational speeds associated with speed modes according to the second embodiment; and FIG. 17 is a table of reference duty ratios associated with commanded rotational speeds according to the second embodiment.

DETAILED DESCRIPTION OF EXEMPLARY EMBODIMENTS

Overview of Embodiment

Figure 1:
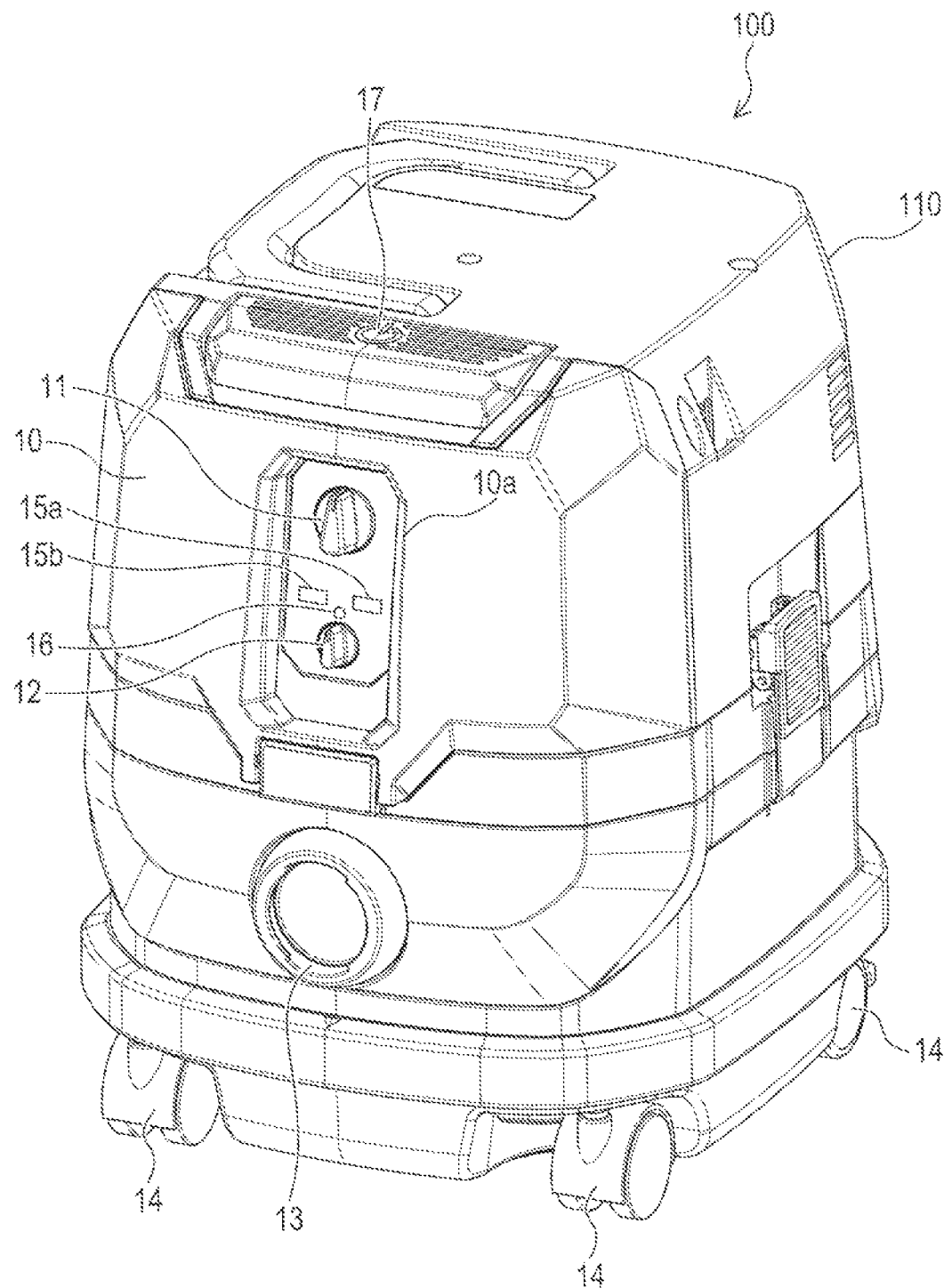
FIG. 1 is an external view of a dust extractor according to a first embodiment with its cover closed.

In one embodiment, an electric work machine may include a motor, a first connector, a second connector, an energizing circuit, a drive switch, and/or a controller. The first connector may be connected to a first battery having a first voltage value. The second connector may be connected to a second battery having a second voltage value. The energizing circuit may receive a first control signal to thereby selectively and electrically connect the first connector or the second connector to the motor. The drive switch may be manually operated by a user to command to start or stop rotation of the motor. The controller may detect the first voltage value and the second voltage value. The controller may receive a first command via the drive switch to start rotation of the motor. The controller may output the first control signal to the energizing circuit based on the first voltage value below the first threshold to electrically disconnect the first connector from the motor. The controller may output the first control signal to the energizing circuit based on the first voltage value equal to or greater than the first threshold to electrically connect the first connector to the motor. The controller may maintain an electrical connection of the first connector to the motor based on the first voltage value below the first threshold and equal to or greater than a second threshold during discharge of the first battery. The second threshold may be less than the first threshold. The controller may output the first control signal to the energizing circuit based on the first voltage value of an energizing battery having fallen below the second threshold during discharge of the first battery so as to (i) electrically disconnect the first connector from the motor and (ii) electrically connect the second connector to the motor.

In one embodiment, the controller may select the first connector rather than the second connector based on (i) receipt of the first command, (ii) the first voltage value equal to or greater than the first threshold, and (iii) the second voltage value equal to or greater than the first threshold to thereby electrically connect the first connector to the motor.

In a case where the electric work machine in one embodiment includes all the features described above, the first battery is used in priority. This configuration enables a user to determine which one of the two batteries should be charged when the battery electrically connected to the motor is changed.

In one embodiment, the electric work machine may further include a speed selector switch to be manually operated by a user to select a first mode or a second mode. The first mode may have a first target rotational speed of the motor. The second mode may have a second target rotational speed distinct from the first target rotational speed. The controller may change the first threshold and/or the second threshold in accordance with the first mode or the second mode selected via the speed selector switch.

In a case where the electric work machine in one embodiment includes all the features described above, the load on the motor in the second mode is different from the load on the motor in the first mode, and thus the amount of voltage drop in the energizing battery in the second mode is different from the amount of voltage drop in the first mode. Accordingly, the first threshold and/or the second threshold are changed in accordance with the first mode or the second mode selected. This configuration allows setting of the first threshold and/or second threshold to relatively low values (or value), in the case of a mode in which the amount of voltage drop is relatively low, so that the discharge capacity of the energizing battery can be increased. This configuration thus can increase the work amount of the electric work machine per charge of the battery.

In one embodiment, the first battery may detect a failure of the first battery, and output a request for discharge prohibition to the first connector based on detection of the failure. The controller may stop discharge of the first battery based on the request for discharge prohibition received via the first connector while the first connector is electrically connected to the motor.

When the electric work machine receives the discharge prohibition signal from the first connector, discharge of the first battery is stopped irrespective of the first voltage value. Thus, it is possible to immediately protect the first battery upon an occurrence of a failure of the first battery.

In one embodiment, the controller may continue discharge of the first battery based on (i) the first voltage value below the second threshold and (ii) the second voltage value below the first threshold, until receipt of the request for discharge prohibition via the first connector.

If (i) the first voltage value falls below the second threshold and (ii) the second voltage value falls below the first threshold, discharge of the first battery is continued until the controller receives the request to prohibit discharge. This configuration can inhibit a run time of the motor 70 during continuous driving thereof from being reduced.

In one embodiment, the electric work machine may further include a drive circuit, a first connection line, and/or a second connection line. The drive circuit may (i) be electrically connected to the motor and (ii) drive the motor in accordance with a second control signal from the controller. The first connection line may connect the first connector to the drive circuit. The second connection line may connect the second connector to the drive circuit. The energizing circuit may include a first switch on the first connection line and/or a second switch on the second connection line. The first switch and the second switch may be turned on or off in accordance with the first control signal.

In a case where the electric work machine in one embodiment includes all the features described above, the controller can turn on the first switch or the second switch to electrically connect the first battery or the second battery to the motor via the drive circuit.

In one embodiment, a method for supplying electric power to a motor of an electric work machine may be provided. The method includes detecting a first voltage value of a first battery and a second voltage value of a second battery, outputting a first control signal in response to the first voltage value being below a first threshold so as to electrically disconnect the first battery from the motor, outputting the first control signal in response to the first voltage value being equal to or greater than the first threshold so as to electrically connect the first battery to the motor, maintaining an electrical connection of the first battery to the motor in response to the first voltage value being below the first threshold and equal to or greater than a second threshold during discharge of the first battery, and outputting the first control signal in response to the first voltage value having fallen below the second threshold during discharge of the first battery so as to (i) electrically disconnect the first battery from the motor and (ii) electrically connect the second battery to the motor. Executing such a method provides the same effects as those achieved by the above-described electric work machine.

In one embodiment, the features described above may be combined in any suitable manner. In one embodiment, any one or more of the features may be considered optional.

Specific Example Embodiments

Hereinafter, example embodiments of the present disclosure will be described with reference to the accompanying drawings.

1. First Embodiment 1-1. Overall Configuration

Figure 2:
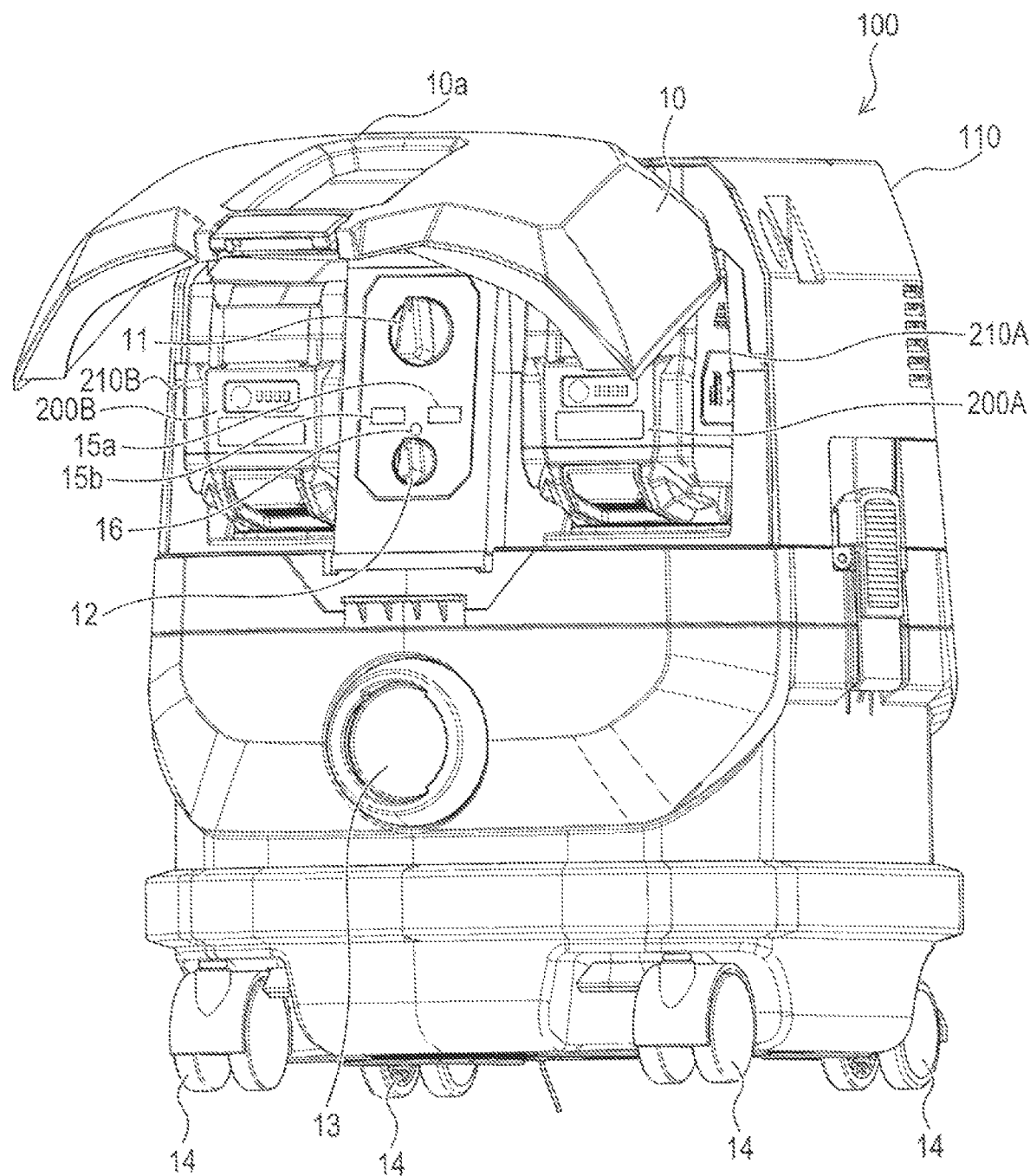
FIG. 2 is an external view of the dust extractor according to the first embodiment with its cover open.

Referring to FIGS. 1 and 2, a configuration of an electric work machine 100 according to the present embodiment will be described. The electric work machine 100 in the present embodiment is a dust extractor (or dust collector).

The electric work machine 100 includes a body 110 with a rectangular cuboid shape. The electric work machine 100 has four wheels 14 at the bottom of the body 110. The body 110 has a round hose attachment port 13 at a lower end of the front face of the body. The hose attachment port 13 allows a hose (not shown) to be attached for suction of dust, cutting scraps, and so on.

The electric work machine 100 includes a cover 10 on the front face of the body 110. The cover 10 is configured such that the bottom end is rotatable on the upper end. The cover 10 has a rectangular window 10a in the center. The window 10a is a through hole penetrating the cover 10.

As illustrated in FIG. 2, the electric work machine 100 includes, behind the cover 10, a first connector 210A and a second connector 210B. The first connector 210A is connected to a first battery 200A. The second connector 210B is connected to a second battery 200B. The first battery 200A and the second battery 200B are the same type of batteries with the same rated voltage. The first battery 200A and the second battery 200B are rechargeable batteries, such as lithium ion batteries, that can be repeatedly charged and discharged.

The first battery 200A outputs a discharge prohibition signal to the electric work machine 100 through the first connector 210A based on detection of a failure of the first battery 200A. The first battery 200A outputs a discharge permission signal to the electric work machine 100 through the first connector 210A based on no detection of a failure of the first battery 200A. A failure includes over-discharge, overheat, and overload on the first battery 200A. The discharge permission signal is to allow the electric work machine 100 to discharge a current from the first battery 200A, whereas the discharge prohibition signal is to request that the electric work machine 100 inhibit discharge from the first battery 200A.

Similarly, the second battery 200B outputs the discharge prohibition signal to the electric work machine 100 through the second connector 210B based on detection of a failure of the second battery 200B. The second battery 200B outputs the discharge permission signal to the electric work machine 100 through the second connector 210B based on no detection of a failure of the second battery 200B.

The first battery 200A and the second battery 200B are not used at the same time. Specifically, only one of the first battery 200A or the second battery 200B discharges a current, but they do not discharge a current at the same time. In the present embodiment, the first battery 200A is used in priority to the second battery 200B that is used when the first battery 200A cannot be used. It should be noted that the electric work machine 100 may include three or more connectors, and the electric work machine 100 may allow three or more batteries to be connected. In a case where three or more batteries are connected to the electric work machine 100, the electric work machine 100 uses the three or more batteries one at a time by rotation.

As illustrated in FIG. 1, the electric work machine 100 includes a drive switch 17 at the front end of the upper face of the body 110. The drive switch 17 is manually operated by a user for a command to start or stop a motor 70 (to be described below) installed in the body 110. In the present embodiment, the drive switch 17 is a push-button switch. At each press of the drive switch 17 by a user, the motor 70 receives one of a start command or a stop command. The start command and the stop command are alternately transmitted. The drive switch 17 corresponds to one example of the manual switch according to the present disclosure.

The electric work machine 100 includes a power switch 11 in an upper portion of the front face of the body 110. The power switch 11 is a dial switch and has a mode switch 11a incorporated therein. The power switch 11 is arranged so as to protrude from the window 10a when the cover 10 is closed. The power switch 11 is manually turned by a user to any one of three positions. The three positions include a linked-operation position, an OFF position, and an ON position. When the power switch 11 is at the OFF position, the main power of the electric work machine 100 and the mode switch h a are OFF. When the power switch 11 is at the ON position, the main power is ON and the mode switch 11a is OFF. When the power switch 11 is at the linked-operation position, the main power and the mode switch 11a are ON. The mode switch 11a outputs a signal indicating whether the power switch 11 is at the linked-operation position. When the power switch 11 is at the linked-operation position, the electric work machine 100 is wirelessly connected to a second electric work machine so as to operate in conjunction with the second electric work machine. One example of the second electric work machine is an electric circular saw. The electric work machine 100, by operating in conjunction with a second electric work machine, can efficiently perform suction of dust and cutting scraps produced during operation of the second electric work machine.

The electric work machine 100 includes battery remaining energy indicators 15a, 15b at positions below the power switch 11 on the front face of the body 110. The battery remaining energy indicators 15a, 15b are arranged so to be visible through the window 10a when the cover 10 is closed. The battery remaining energy indicator 15a and the battery remaining energy indicator 15b respectively indicate a remaining energy of the first battery 200A and a remaining energy of the second battery 200B. The battery remaining energy indicator 15a includes light emitting diodes to display the remaining energy of the first battery 200A in, for example, three levels. The battery remaining energy indicator 15b includes light emitting diodes to display the remaining energy of the second battery 200B in, for example, three levels. The battery remaining energy indicators 15a, 15b also alert a user of occurrence of switching when the energizing battery is switched. When the energizing battery is switched from the first battery 200A to the second battery 200B, the battery remaining energy indicator 15a blinks, and the battery remaining energy indicator 15b displays the remaining energy of the second battery 200B. The energizing battery is one of the first or second batteries 200A, 200B electrically connected to the motor 70.

The electric work machine 100 includes an indicator switch 16 at a position between the battery remaining energy indicator 15a and the battery remaining energy indicator 15b on the front face of the body 110. The indicator switch 16 is arranged so as to be accessible through the window 10a when the cover 10 is closed. In the present embodiment, the indicator switch 16 is a push-button switch. When the indicator switch 16 is pressed by a user, the battery remaining energy indicators 15a, 15b display the remaining energies of the first and second batteries 200A, 200B for a specific period of time.

The electric work machine 100 includes a speed setter 12 at a position below the battery remaining energy indicators 15a, 15b on the front face of the body 110. The speed setter 12 is a dial switch. The speed setter 12 is arranged so as to protrude from the window 10a when the cover 10 is closed. The speed setter 12 is configured to be turned by a user to set the rotational speed of the motor 70. The electric work machine 100 has two or more speed modes. Each of the speed modes has a target rotational speed different from target rotational speeds for other speed modes. In order to set one of the speed modes, the speed setter 12 is manually turned by a user. Specifically, in the present embodiment, the electric work machine 100 has eleven speed modes from level 0 through level 10. That is, the electric work machine 100 has eleven target rotational speeds distinct from one another. The speed setter 12 is turned by a user to any one of twelve positions that includes the positions for the eleven speed modes from level 0 through level 10 and a stop position.

1-2. Electrical Configuration

Figure 3:
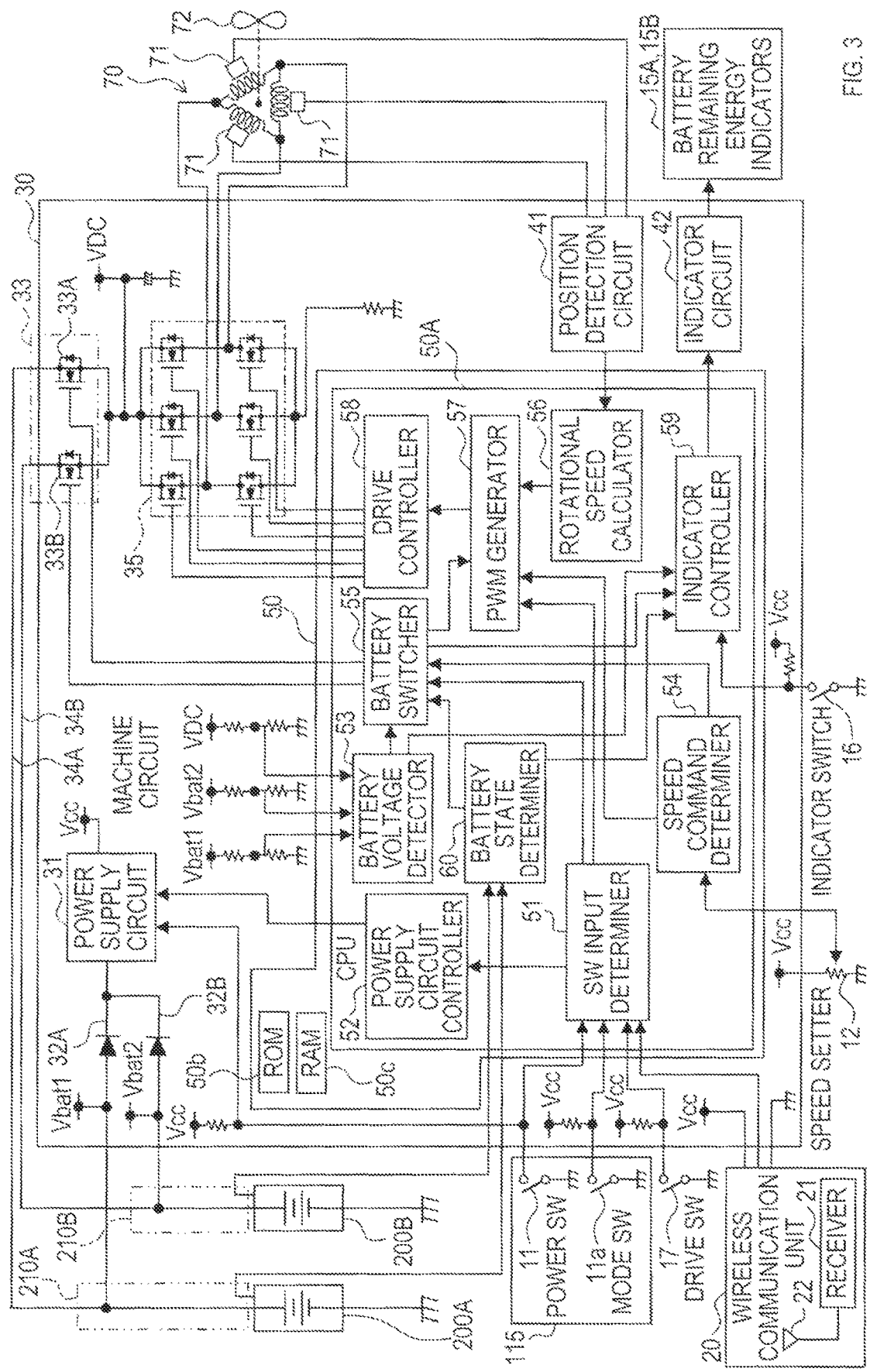
FIG. 3 is a block diagram of an electrical configuration of the dust extractor according to the first embodiment.

Next, the electrical configuration of the electric work machine 100 will be described with reference to FIG. 3.

The electric work machine 100 includes the motor 70 that is a three-phase brushless motor. The electric work machine 100 includes three position sensors 71 each having a Hall integrated circuit chip (hereinafter Hall IC) arranged in relation to an associated phase of the motor 70. Each Hall IC outputs a rotation detection signal to a position detection circuit 41 (to be described below) at every rotation of the rotor of the motor 70 by a specific angle. The electric work machine 100 includes a fan 72. The fan 72 is connected to the rotational shaft of the motor 70. The fan 72 is rotated by a driving force of the motor 70 to thereby generate a suction force.

The electric work machine 100 includes a switch unit 115. The switch unit 115 includes the above-mentioned power switch 11. The power switch 11 outputs a power ON signal to a switch input determiner 51 and a power supply circuit 31 (to be described below) in response to the power switch 11 being turned to the ON position or the linked-operation position. The power switch 11 outputs a power OFF signal to the switch input determiner 51 in response to the power switch 11 being turned to the OFF position.

The switch unit 115 includes the mode switch 11a. The mode switch 11a outputs a linked-operation ON signal to the switch input determiner 51 in response to the power switch 11 being turned to the linked-operation position. The power switch 11 outputs a linked-operation OFF signal to the switch input determiner 51 in response to the power switch 11 being turned to the OFF position or the ON position.

The electric work machine 100 includes the above-mentioned drive switch 17. The drive switch 17 outputs one of a drive ON signal or a drive OFF signal to the switch input determiner 51 at each press of the drive switch 17. The drive ON signal and the drive OFF signal are alternately output.

The electric work machine 100 includes the above-mentioned speed setter 12. The speed setter 12 includes a slide resistor and outputs, to a speed command determiner 54 (to be described below), a resistance value in accordance with the speed mode indicated by the position of the speed setter 12. The electric work machine 100 includes the above-mentioned indicator switch 16. The indicator switch 16, when being pressed by a user, outputs an indicator ON signal to an indicator controller 59 which will be described below.

The electric work machine 100 includes a wireless communication unit 20. The wireless communication unit 20 includes a receiver 21 and an antenna 22. The wireless communication unit 200 wirelessly receives a drive signal for driving the motor 70 from a second electric work machine, and outputs the received drive signal to the switch input determiner 51. Based on the drive signal received from the second electric work machine with the wireless communication unit 20, it is possible to start or stop the motor 70 in accordance with operation of the second electric work machine.

The electric work machine 100 includes a machine circuit 30. The machine circuit 30 includes the power supply circuit 31. The machine circuit 30 includes a first diode 32A. The power supply circuit 31 is connected to the positive electrode of the first battery 200A via the first diode 32A and the first connector 210A. The machine circuit 30 also includes a second diode 32B. The power supply circuit 31 is connected to the positive electrode of the second battery 200B via the second diode 32B and the second connector 210B. Accordingly, the power supply circuit 31 receives electric power from one of the first battery 200A or the second battery 200B having a higher voltage to thereby generate a specified power supply voltage Vcc. The power supply circuit 31 generates the power supply voltage Vcc based on the power ON signal received from the power switch 11 or a circuit ON signal received from a power supply circuit controller 52 which will be described below. The power supply circuit 31 supplies the generated power supply voltage Vcc to various circuits including a control circuit 50 for example, within the machine circuit 30.

The machine circuit 30 includes a motor drive circuit 35. The motor drive circuit 35 is a three-phase full bridge circuit with three switching devices on a high side and three switching devices on a low side. The motor drive circuit 35 is connected to the motor 70 and allows a passage of an electric current to a winding of each phase of the motor 70.

The machine circuit 30 includes a first connection line 34A and a second connection line 34B. The first connection line 34A connects the first connector 210A to the motor drive circuit 35. The second connection line 34B connects the second connector 210B to the motor drive circuit 35.

The machine circuit 30 includes an energizing circuit 33. The energizing circuit 33 electrically connects one of the first connector 210A or the second connector 210B to the motor drive circuit 35, thereby energizing the motor 70. The energizing circuit 33 includes a first switch 33A. The first switch 33A is a field-effect transistor (hereinafter, FET) and arranged on the first connection line 34A. The energizing circuit 33 includes a second switch 33B. The second switch 33B is an FET and arranged on the second connection line 34B.

The first and second switches 33A, 33B are turned ON based on an ON signal from a battery switcher 55 (to be described below) and become conductive. The first and second switches 33A, 33B are turned OFF based on an OFF signal from the battery switcher 55 and become non-conductive. The battery switcher 55 transmits an ON signal to one of the first switch 33A or the second switch 33B and transmits an OFF signal to the other switch. Alternatively, the battery switcher 55 transmits an OFF signal to both of the first and second switches 33A, 33B.

The motor drive circuit 35 receives electric power from the energizing battery that is one of the first battery 200A or the second battery 200B connected to a selected connector, and allows a passage of an electric current to the winding of each phase of the motor 70. The selected connector is one of the first connector 210A or the second connector 210B that is electrically connected to the motor drive circuit 35 via the energizing circuit 33. Each of the switching devices of the motor drive circuit 35 is turned ON or OFF in accordance with a control command output from the control circuit 50 (to be described below).

The machine circuit 30 includes a position detection circuit 41. The position detection circuit 41 detects a rotational position of the rotor of the motor 70 based on rotation detection signals received from the position sensors 71. The position detection circuit 41 outputs a position signal corresponding to the detected rotational position to the control circuit 50.

The machine circuit 30 includes the control circuit 50. The control circuit 50 includes a CPU 50a, a ROM 50b, a RAM 50c and an I/O. Various functions of the control circuit 50 are achieved by executing programs stored in a non-transitory tangible storage medium with the CPU 50a. In the present embodiment, the ROM 50b corresponds to one example of the non-transitory tangible storage medium. By executing one of the programs, a process corresponding to the program is executed. It should be noted that some of or all of the functions executed by the CPU 50a may be configured as hardware, such as one IC or two or more ICs. Moreover, the control circuit 50 may consist of a single microcomputer, or may consist of two or more microcomputers. In the present embodiment, the control circuit 50 corresponds to one example of the controller.

As the various functions, the control circuit 50 includes the switch input determiner 51, the power supply circuit controller 52, a battery voltage detector 53, the speed command determiner 54, a battery state determiner 60, the battery switcher 55, a rotational speed calculator 56, a pulse-width modulation (hereinafter, PWM) generator 57, a drive controller 58, and an indicator controller 59. In the present embodiment, the control circuit 50 has all the functions described above. However, some of the functions may be optional in other embodiments.

The switch input determiner 51, based on receipt of the power ON signal and the drive ON signal, determines that driving of the motor 70 is requested. The switch input determiner 51, based on receipt of one or more of the power OFF signal and the drive OFF signal, determines that driving of the motor 70 is not requested. The switch input determiner 51, based on receipt of the linked-operation ON signal, determines that linked-operation is requested. The switch input determiner 51, when determining that driving of the motor 70 is requested, outputs a drive request signal to the power supply circuit controller 52, the battery switcher 55, and the PWM generator 57. The switch input determiner 51, when determining that linked-operation is requested, outputs the drive signal received from the wireless communication unit 20 to the PWM generator 57.

The power supply circuit controller 52, based on receipt of the drive request signal, outputs the circuit ON signal to the power supply circuit 31.

The speed command determiner 54 sets a target value for rotational speed based on the resistance value received from the speed setter 12, and outputs the set target value to the battery switcher 55 and the PWM generator 57. The target value for rotational speed corresponds to the target rotational speed or a target duty ratio.

The rotational speed calculator 56 calculates the actual rotational speed of the motor 70 based on the position signal received from the position detection circuit 41, and outputs a calculation result to the PWM generator 57.

The battery state determiner 60 receives the discharge permission signal or the discharge prohibition signal from the first battery 200A via the first connector 210A, and thereby determines whether the first battery 200A is allowed to discharge. Similarly, the battery state determiner 60 receives the discharge permission signal or the discharge prohibition signal from the second battery 200B via the second connector 210B, and thereby determines whether the second battery 200B is allowed to discharge. The battery state determiner 60 outputs a result of battery state determination regarding the first battery 200A and the second battery 200B to the battery switcher 55 and the indicator controller 59.

The battery voltage detector 53 detects a voltage value of the first battery 200A (hereinafter, first voltage value) and a voltage value of the second battery 200B (hereinafter, second voltage value), and outputs the detected first and second voltage values to the battery switcher 55 and the indicator controller 59.

The battery switcher 55 controls the energizing circuit 33 based on the first voltage value, the second voltage value, the result of battery state determination, the drive request signal, and the target value for rotational speed. That is, the battery switcher 55, based on various input signals, outputs a switch ON signal or a switch OFF signal to the first and second switches 33A, 33B. The battery switcher 55 outputs the switch ON signal or the switch OFF signal also to the indicator controller 59.

The PWM generator 57 generates a PWM signal based on (i) the drive request signal, (ii) the target value for rotational speed, and (iii) the calculated rotational speed. Alternatively, the PWM generator 57 generates the PWM signal based on the drive signal received from the wireless communication unit 20 via the switch input determiner 51. The PWM generator 57 outputs the generated PWM signal to the drive controller 58.

The drive controller 58 generates the control command based on the PWM signal received from the PWM generator 57, and outputs the generated control command to the motor drive circuit 35. As a result, a pulse voltage based on the PWM signal is applied to the winding of each phase of the motor 70.

In addition, the machine circuit 30 includes an indicator circuit 42. The indicator controller 59 turns ON or OFF the battery remaining energy indicators 15a, 15b, or controls the battery remaining energy indicators 15*a*, 15*b* to blink via the indicator circuit 42 based on (i) the indicator ON signal, (ii) the first voltage value, (iii) the second voltage value, (iv) the result of battery state determination, (v) the switch ON signal, or the switch OFF signal.

1-3. Processes

1-3-1. Motor Driving Process

Next, a motor driving process executed by the control circuit 50 will be described with reference to a flow chart in FIG. 4. The control circuit 50, when being activated, initiates the present process.

In S10, the control circuit 50 stops driving the motor 70.

In S20, the control circuit 50 determines an input from each switch. Specifically, the control circuit 50 determines ON/OFF or the position of each switch.

In S30, the control circuit 50 acquires data on the speed mode set by the speed setter 12.

In S40, the control circuit 50 acquires the result of battery state determination of the first battery 200A and the second battery 200B.

In S50, the control circuit 50 acquires the first voltage value and the second voltage value.

In S60, the control circuit 50 executes an energizing battery determination process. Specifically, the control circuit 50 determines which one of the first battery 200A or the second battery 200B should be allowed to discharge. The energizing battery determination process will be described below in detail.

Subsequently in S70, the control circuit 50 determines whether the drive switch 17 has been pressed while the motor 70 is stationary. The control circuit 50, if determining that the drive switch 17 has been pressed (S70: YES), proceeds to S80. The control circuit 50, if determining that the drive switch 17 has not been pressed (S70: NO), returns to S10. Although it is not illustrated in the flow chart of FIG. 4, the control circuit 50 returns to S10, if determining that the drive switch 17 has been pressed while the motor 70 is in motion.

In S80, the control circuit 50 executes a battery switching process. Specifically, when it is necessary to switch the battery electrically connected to the motor 70, the control circuit 50 switches the selected connector and thus the energizing battery via the energizing circuit 33. The battery switching process will be described below in detail.

Subsequently in S90, the control circuit 50 acquires the target duty ratio or the target rotational speed as the target value for rotational speed of the motor 70. In the present embodiment, the control circuit 50 acquires the target duty ratio. Specifically, as illustrated in FIG. 9, Table 1 defining a relationship of each speed mode with the target duty ratio is prepared in advance and stored in the ROM 50*b*. In S90, the control circuit 50 acquires the target duty ratio based on the speed mode set via the speed setter 12 and Table 1.

Subsequently in S100, the control circuit 50 acquires the actual rotational speed of the motor 70.

In S110, the control circuit 50 executes a motor output process. Specifically, the control circuit 50 calculates an output duty ratio based on the acquired target duty ratio to thereby generate the PWM signal based on the calculated output duty ratio. Furthermore, the control circuit 50 generates the control command based on the generated PWM signal to output the generated control command to the motor drive circuit 35. The motor output process will be described below in detail.

1-3-2. Energizing Battery Determination Process

Figure 5A:
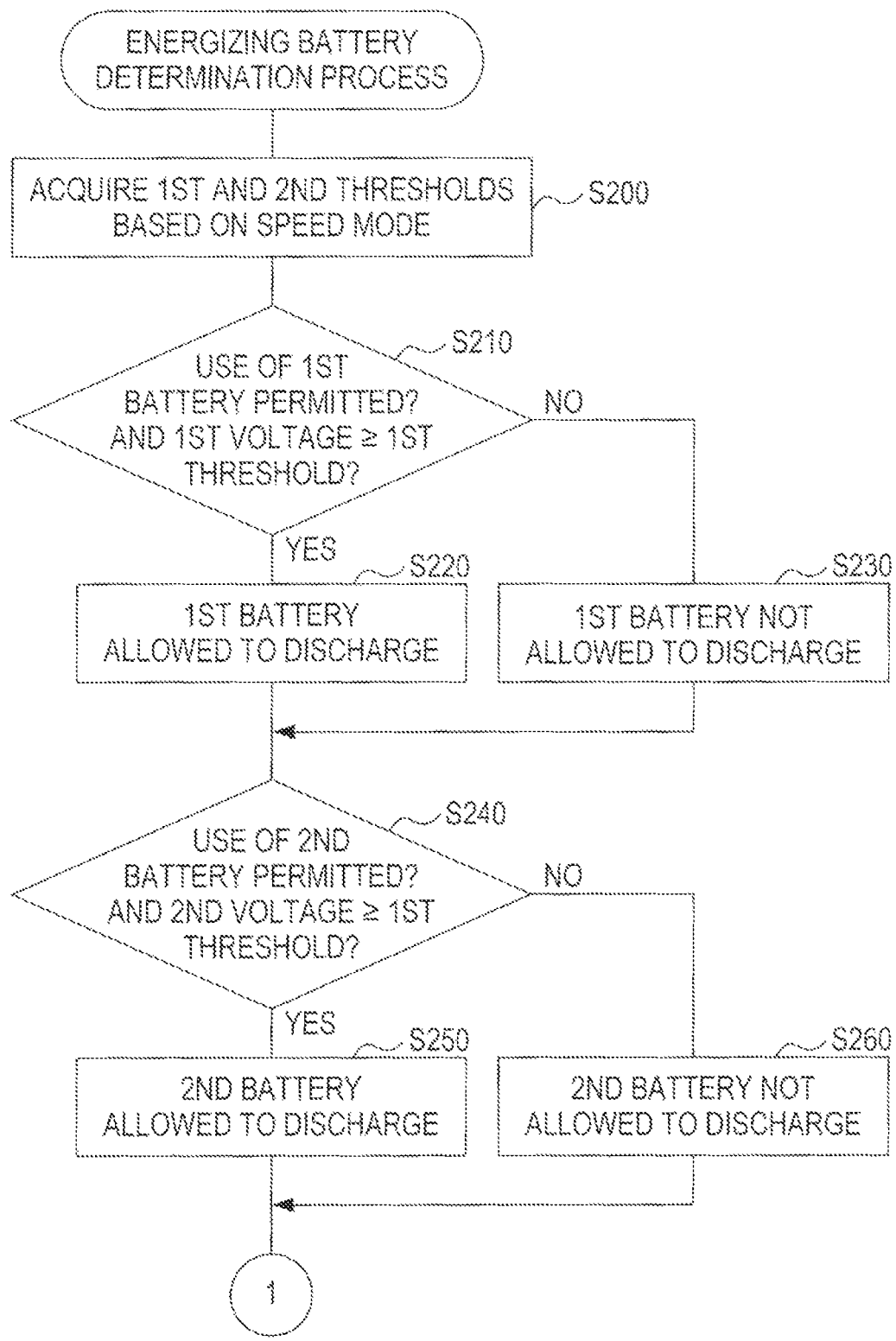
FIG. 5A is a flow chart of one part of an energizing battery determination process according to the first embodiment.
Figure 5B:
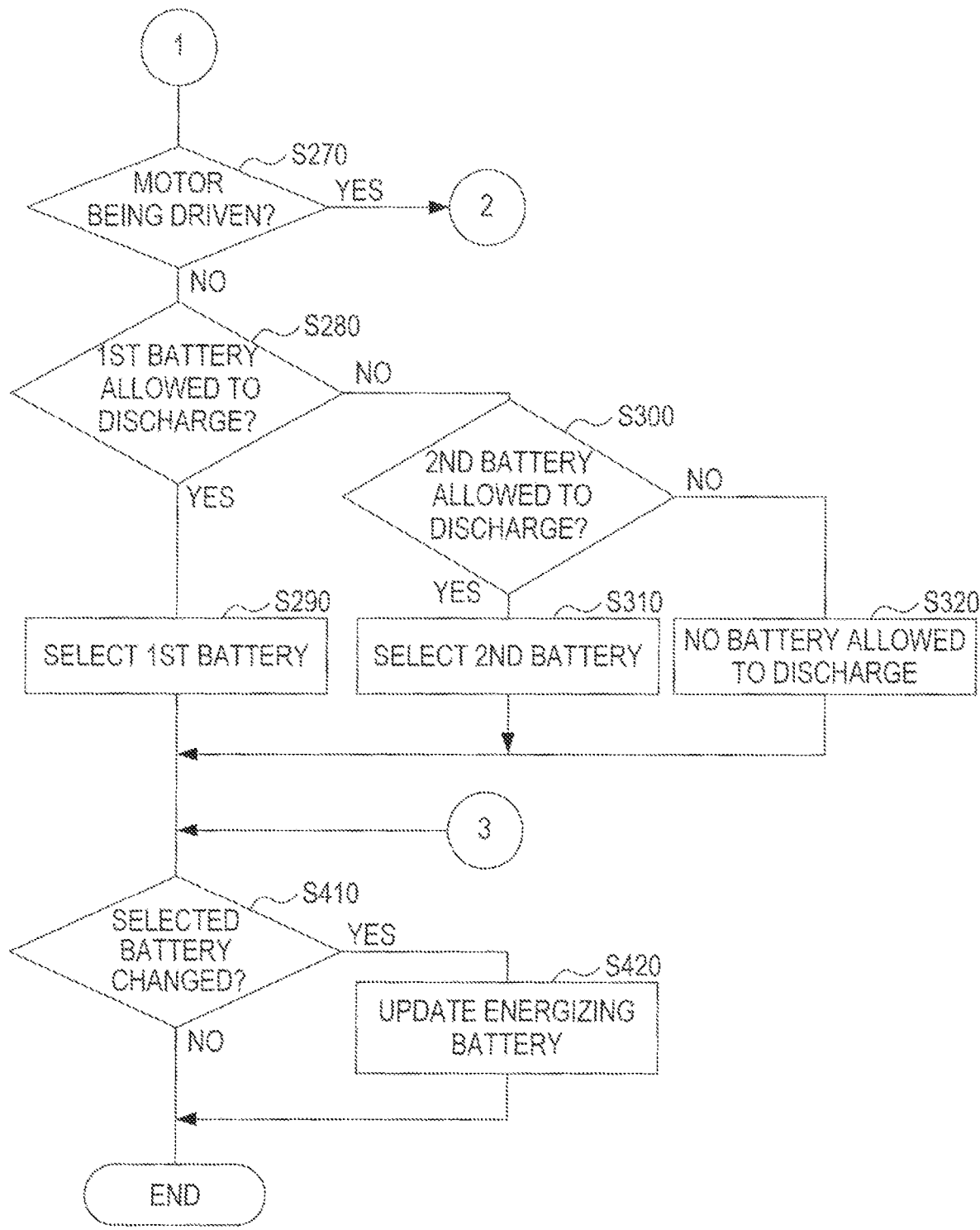
FIG. 5B is a flow chart of another part of the energizing battery determination process according to the first embodiment.
Figure 5C:
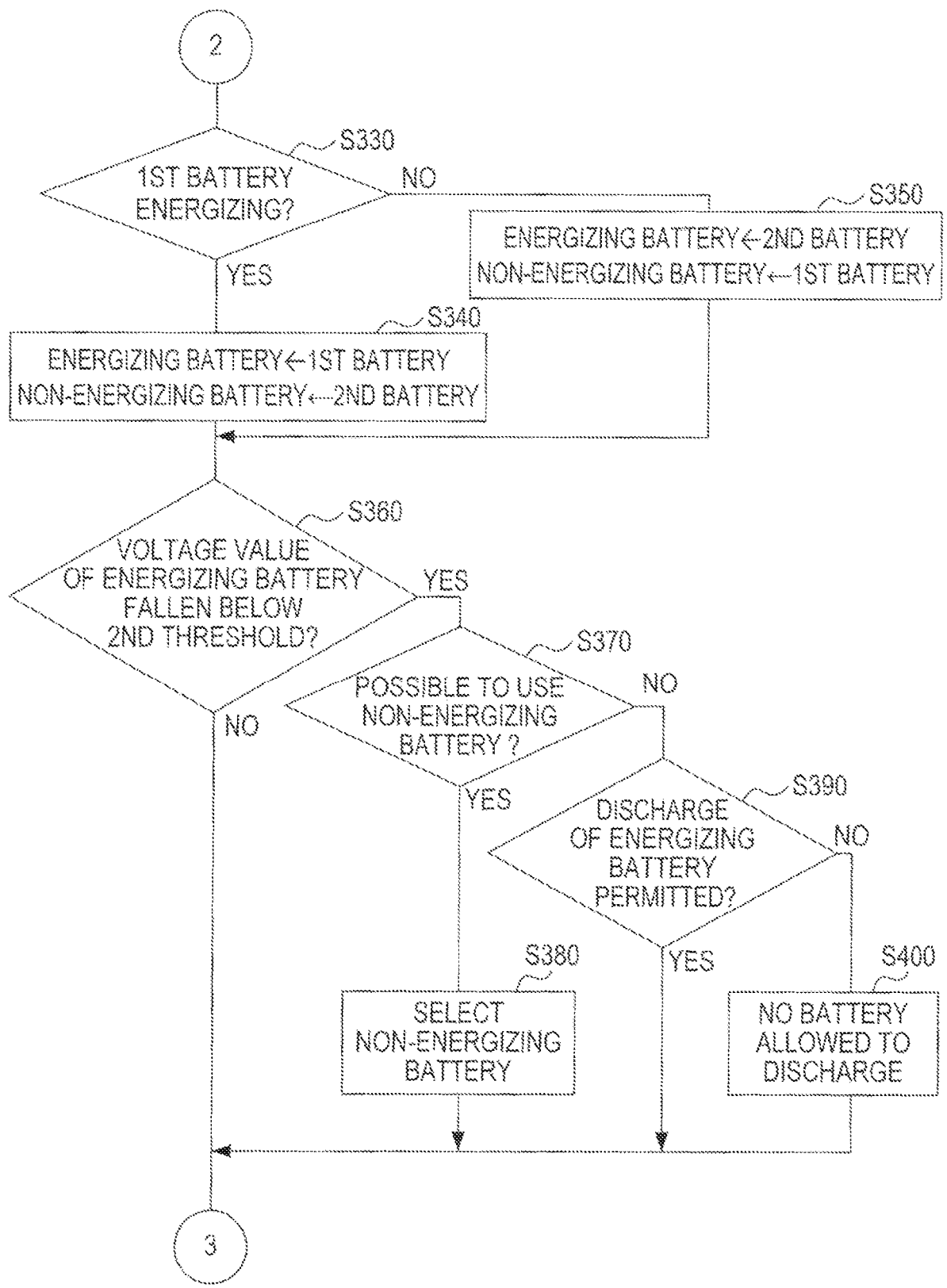
FIG. 5C is a flow chart of the remainder of the energizing battery determination process according to the first embodiment.

Next, the energizing battery determination process executed by the control circuit 50 in S60 will be described with reference to a flow chart in FIGS. 5A to 5*c*.

In S200, the control circuit 50 acquires a first threshold and a second threshold based on the set speed mode. The first threshold corresponds to a voltage value based on which it is determined whether the first and second batteries 200A, 200B are ready for discharge when the motor 70 is started. The second threshold corresponds to a voltage value based on which it is determined whether the energizing battery has become unable to discharge a current during a discharge. If the energizing battery has become unable to discharge, the control circuit 50 automatically switches the energizing battery to another battery while driving the motor 70.

In a case where the control circuit 50 determines which the battery should be electrically connected to the motor 70 based on one threshold, switching between the first battery 200A and the second battery 200B may automatically occur on a frequent basis while the motor 70 is driven.

For example, when the first voltage value falls below a specified threshold, the energizing battery is switched from the first battery 200A to the second battery 200B. Due to the switching, the first voltage value is increased by the amount of voltage drop in the first battery 200A, and thus may exceed the specified threshold. As a result, when the second voltage value falls below the specified threshold, the energizing battery is switched from the second battery 200B to the first battery 200A. Due to the switching, the second voltage value is increased by the amount of voltage drop in the second battery 200B. When discharge from the first battery 200A starts, the first voltage value immediately falls below the specified threshold, thus causing switching of the energizing battery. Accordingly, the energizing battery is frequently switched between the two batteries each having a voltage value close to the specified threshold. Furthermore, energization of the motor 70 is stopped and rotation of the motor 70 is started repetitively on a frequent basis as a result of such switching of the energizing battery. This makes users feel uncomfortable.

In light of the case described above, in order to inhibit frequent automatic switching of the energizing battery while the motor 70 is driven, the battery to be connected to the motor 70 is determined in the present embodiment based on the first threshold and the second threshold. The first threshold is greater than the second threshold, and the difference between the first threshold and the second threshold is greater than the amount of voltage drop in the first and second batteries 200A, 200B.

When the battery voltage value of the first battery 200A falls below a protection threshold, the first battery 200A determines that the first battery 200A has failed, thus requesting that the electric work machine 100 inhibit discharge. Similarly, when the battery voltage value of the second battery 200B falls below the protection threshold, the second battery 200B determines that the second battery 200B has failed, thus requesting that the electric work machine 100 inhibit discharge. The protection threshold is set in accordance with the type of the first and second batteries 200A, 200B. Accordingly, depending on the type of the first and second batteries 200A, 200B, the protection threshold may be greater than the second threshold, and thus discharge from the energizing battery may be stopped before the voltage value of the energizing battery falls below the second threshold.

It is also conceivable that the electric work machine 100 does not have the second threshold, and discharge from the energizing battery continues until discharge prohibition is requested from the energizing battery. However, depending on the type of the first and second batteries 200A, 200B, the protection threshold may be set relatively high, or the protection threshold may be set relatively low. In a case where the protection threshold is set relatively low, if discharge from the energizing battery is continued until the voltage value of the energizing battery falls below the protection threshold, output of the electric work machine 100 may decrease, thereby deteriorating the operational performance of the electric work machine 100. In addition, in a case where the protection threshold is set relatively low, if discharge from the energizing battery is continued until the voltage value falls below the protection threshold and subsequently the energizing battery is switched to a fully charged battery (a battery with a large remaining energy), the rotational speed of the motor 70 suddenly increases, thus making a user feel very uncomfortable. In light of this, the electric work machine 100 has the second threshold regardless of the type of the first and second batteries 200A, 200B so that a stable usability is provided to a user.

As illustrated in FIG. 6, Table 2 defining the relationship of each speed mode with the first threshold and the second threshold is prepared in advance and stored in the ROM 50b. Specifically, the first and second thresholds decrease in accordance with a decrease in the speed in each of the speed modes (that is, the speed level). The load on the motor 70 and the amount of voltage drop in the first and second batteries 200A, 200B are different in each speed mode. In a lower speed mode, the load on motor is smaller, and the amount of voltage drop is also smaller. Thus, in the lower speed mode, the first and second thresholds are set less than the first and second thresholds in a higher speed mode so that the discharge capacities of the first and second batteries 200A, 200B are increased. In S200, the control circuit 50 acquires the first threshold and the second threshold based on the set speed mode and Table 2. In the present embodiment, the first and second thresholds are both set to decrease in accordance with a decrease in the speed in each of the speed modes. However, only one of the first and second thresholds may be set to decrease with a decrease in the speed.

Subsequently in S210, the control circuit 50 determines whether (i) the control circuit 50 has received the discharge permission signal from the first battery 200A, and (ii) the first voltage value is equal to or greater than the first threshold. The control circuit 50, if determining that (i) the discharge permission signal has been received from the first battery 200A and (ii) the first voltage value is equal to or greater than the first threshold (S210: YES), proceeds to S220.

In S220, the control circuit 50 determines that the first battery 200A is allowed to discharge.

In S210, if the control circuit 50 determines that (i) the discharge prohibition signal has been received from the first battery 200A, or (ii) the first voltage value is less than the first threshold (S210: NO), the control circuit 50 proceeds to S230.

In S230, the control circuit 50 determines that the first battery 200A is not allowed to discharge.

Subsequently in S240, the control circuit 50 determines whether (i) the control circuit 50 has received the discharge permission signal from the second battery 200B, and (ii) the second voltage value is equal to or greater than the first threshold. The control circuit 50, if determining that (i) the discharge permission signal has been received from the second battery 200B and (ii) the second voltage value is equal to or greater than the first threshold (S240: YES), proceeds to S250.

In S250, the control circuit 50 determines that the second battery 200B is allowed to discharge.

In S240, if the control circuit 50 determines that (i) the discharge prohibition signal has been received from the second battery 200B, or (ii) the second voltage value is less than the second threshold (S240: NO), the control circuit 50 proceeds to S260.

In S260, the control circuit 50 determines that the second battery 200B is not allowed to discharge.

Subsequently in S270, the control circuit 50 determines whether the motor 70 is being driven. The control circuit 50, if determining that the motor 70 is not being driven (S270: NO), proceeds to S280.

In S280, the control circuit 50 determines whether a determination has been made that the first battery 200A is allowed to discharge based on results of the processes in S220 and S230. The control circuit 50, if determining that the first battery 200A has been allowed to discharge (S280: YES), proceeds to S290, whereas, if determining that the first battery 200A has not been allowed to discharge (S280: NO), proceeds to S300.

In S290, the control circuit 50 selects the first battery 200A to energize the motor 70.

In S300, the control circuit 50 determines whether a determination has been made that the second battery 200B is allowed to discharge based on results of the processes in S250 and S260. The control circuit 50, if determining that the second battery 200B has been allowed to discharge (S00: YES), proceeds to S310, whereas, if determining that the second battery 200B has not been allowed to discharge (S300: NO), proceeds to S320.

In S310, the control circuit 50 selects the second battery 200B to energize the motor 70.

The control circuit 50 determines whether the first battery 200A is allowed to discharge prior to determining whether the second battery 200B is allowed to discharge. Because of this order, if the first battery 200A is allowed to discharge, the first battery 200A is used in priority regardless of whether the second battery 200B being allowed to discharge.

In S320, the control circuit 50 determines that neither of the first and second batteries 200A, 200B is allowed to discharge.

In S270, if the control circuit 50 determines that the motor 70 is being driven (S270: YES), the control circuit 50 proceeds to S330.

In S330, the control circuit 50 determines whether the first battery 200A is energizing the motor 70. That is, the control circuit 50 determines whether the first connector 210A is electrically connected to the motor 70. The control circuit 50, if determining that the first battery 200A is energizing the motor 70 (S330: YES), proceeds to S340. In S340, the control circuit 50 sets the first battery 200A as the energizing battery and the second battery 200B as a non-energizing battery.

In S330, if the control circuit 50 determines that the first battery 200A is not energizing the motor 70, that is, determines that the second battery 200B is energizing the motor 70 (S350. NO), the control circuit 50 proceeds to S350. In S350, the control circuit 50 sets the second battery 200B as the energizing battery and the first battery 200A as the non-energizing battery.

Subsequently in S360, the control circuit 50 determines whether the voltage value of the energizing battery has become less than the second threshold. In this step, since the energizing battery is being discharged, the control circuit 50 determines whether it is possible to continue the discharge based on the second threshold.

In S360, if the control circuit 50 determines that the voltage value of the energizing battery is equal to or greater than the second threshold (S360: NO), the control circuit 50 proceeds to S410 since it is not necessary to change the battery in use.

In S360, if the control circuit 50 determines that the voltage value of the energizing battery is less than the second threshold (S360: YES), the control circuit 50 proceeds to S370. In S370, the control circuit 50 determines whether the non-energizing battery is allowed to discharge. The control circuit 50, if determining that the non-energizing battery is allowed to discharge (S370: YES), proceeds to S380. In S380, the control circuit 50 selects the non-energizing battery as a battery to be energizing the motor 70.

In S370, if the control circuit 50 determines that the non-energizing battery is not allowed to discharge (S370: NO), the control circuit 50 proceeds to S390. In S390, the control circuit 50 determines whether the control circuit 50 has received the discharge permission signal from the energizing battery. The control circuit 50, if determining that the discharge permission signal has been received from the energizing battery (S390: YES), proceeds directly to S410. If the non-energizing battery is not allowed to discharge, no alternative battery is available. Thus, the control circuit 50 continues the discharge from the energizing battery until receipt of the discharge prohibition signal from the energizing battery. The control circuit 50 may immediately stop the discharge from the energizing battery if no alternative battery is available.

In S390, if the control circuit 50 determines that the discharge prohibition signal has been received from the energizing battery (S390: NO), the control circuit 50 proceeds to S400. In S400, the control circuit 50 determines that no dischargeable battery is available, thus proceeding to S410.

Subsequently in S410, the control circuit 50 determines whether the selected battery has been changed. Specifically, the control circuit 50 determines whether S380 has been executed. The control circuit 50, if determining that the selected battery has been changed (S410: YES), sets in S420 a newly selected battery as the energizing battery to update the energizing battery. Based on this update, the battery remaining energy indicators 15a, 15b blink or are turned ON for a given period of time to notify a user of switching of the energizing battery. Subsequently, the control circuit 50 proceeds to S70.

In S410, if the control circuit 50 determines that the selected battery has not been changed (S410: NO), the control circuit 50 proceeds to S70.

1-3-3. Battery Switching Process

Figure 7:
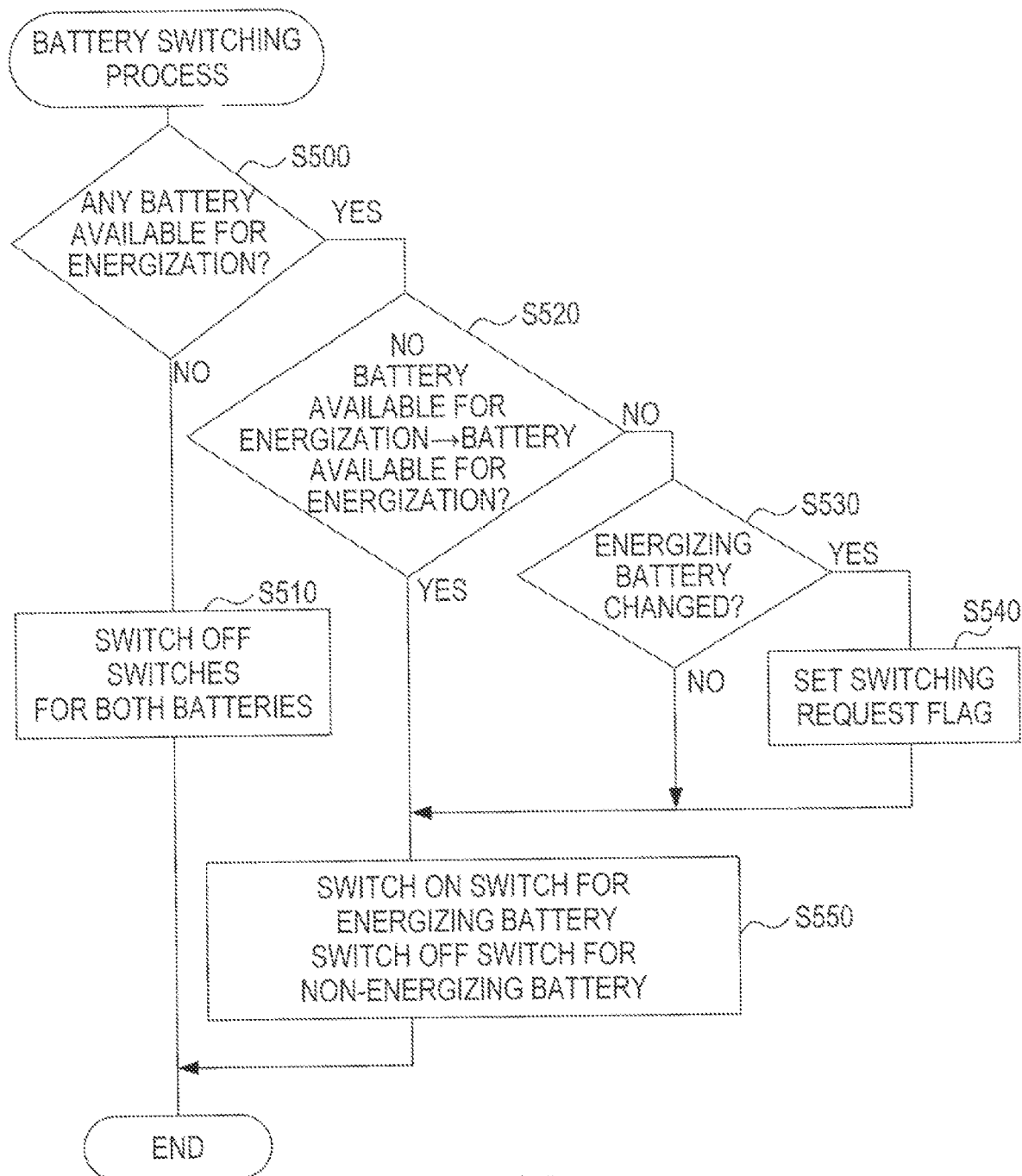
FIG. 7 is a flow chart of a battery switching process according to the first embodiment.

Next, the battery switching process executed in S80 by the control circuit 50 will be described with reference to a flow chart of FIG. 7.

In S500, the control circuit 50 determines whether there is any battery available for energizing the motor 70. The control circuit 50, if determining that no battery is available for energizing the motor 70, that is determining that no battery is allowed to discharge (S500: NO), proceeds to S510.

In S510, the control circuit 50 turns OFF both of the first and second switches 33A, 33B. Specifically, the control circuit 50 interrupts the electrical connection of both of the first and the second connector 210A, 210B with the motor 70. Due to the interruption, no current is discharged from either of the first battery 200A or the second battery 200B. Subsequently, the control circuit 50 proceeds to S90.

In S500, if the control circuit 50 determines that at least one battery is available for energizing the motor 70 (S500: YES), the control circuit 50 proceeds to S520. In S520, the control circuit 50 determines, based on the result of the energizing battery determination process in S60, whether the state where no battery is available for energization (no battery available state) has transitioned to the state where at least one battery is available for energization (battery available state). The control circuit 50, if determining that the no battery available state has transitioned to the battery available state (S520: YES), proceeds to S550. The control circuit 50, if determining that the no battery available state has not transitioned to the battery available state (S520: NO), proceeds to S530.

In S530, the control circuit 50 determines whether the energizing battery has been changed based on the result of the energizing battery determination process in S60. The control circuit 50, if determining that the energizing battery has not been changed (S530: NO), proceeds to S550. The control circuit 50, if determining that the energizing battery has been changed (S530: YES), proceeds to S540.

In S540, the control circuit 50 sets a switching request flag. Based on the flag, when the motor 70 is restarted as a result of switching of the energizing battery, a second soft start is executed. The second soft start distinct from a first soft start that is executed when the motor 70 is started as a result of manipulation of the drive switch 17. Subsequently, the control circuit 50 proceeds to S550.

In S550, the control circuit 50 turns ON the switch on the energizing battery side among the first and second switches 33A, 33B, and turns OFF the switch on the non-energizing battery side. If the energizing battery is changed, the control circuit 50 controls the first and second switches 33A, 33B so that charging and discharging does not occur between the first battery 200A and the second battery 200B. Specifically, the control circuit 50 temporarily turns OFF both of the first and second switches 33A, 33B, and then turns ON the switch on the energizing battery side. Subsequently, the control circuit 50 proceeds to S90.

1-3-4. Motor Output Process

Figure 8:
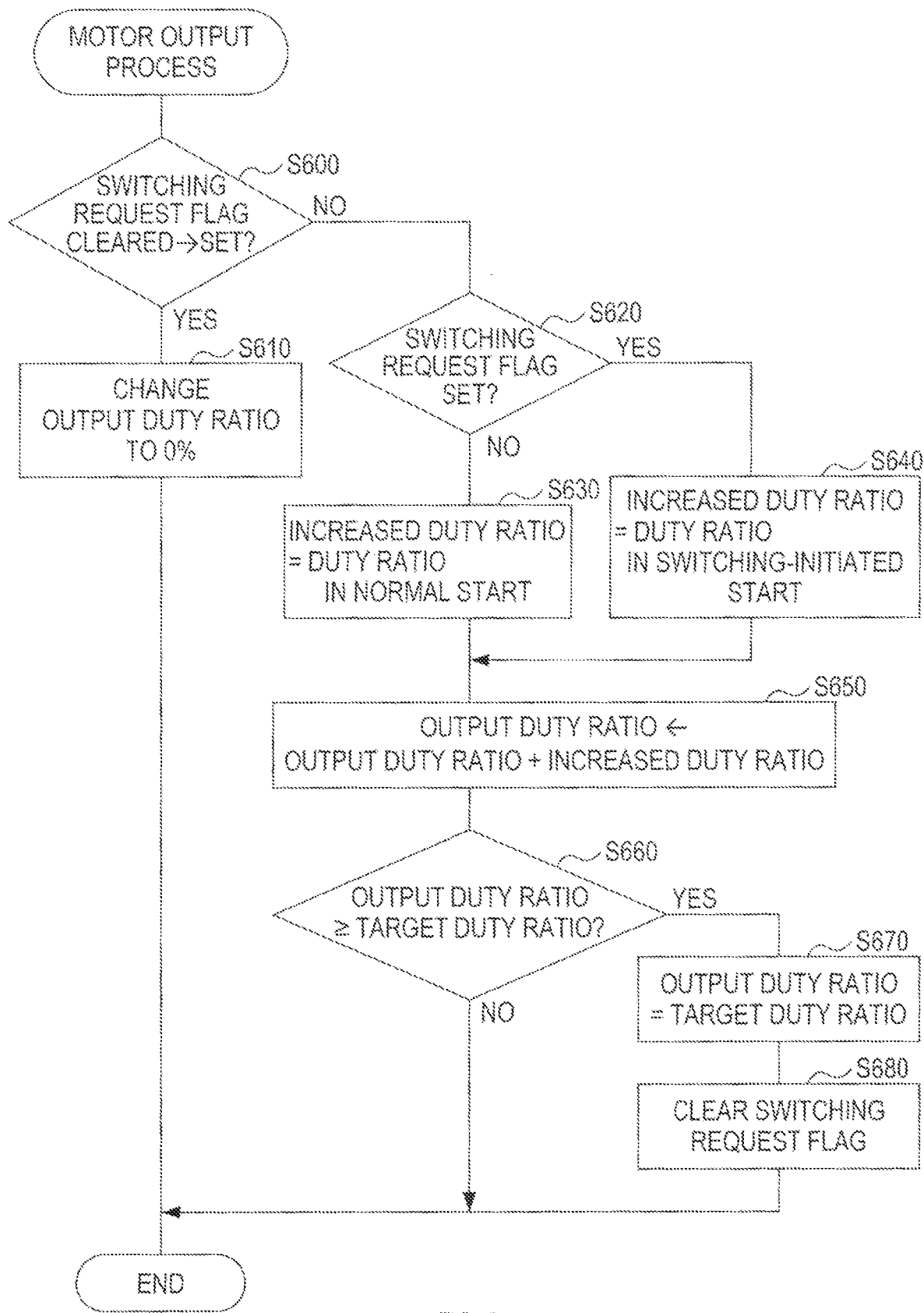
FIG. 8 is a flow chart of motor output process according to the first embodiment.

Next, the motor output process executed by the control circuit 50 in S110 will be described with reference to a flow chart of FIG. 8.

In S600, the control circuit 50 determines, based on the result of the battery switching process executed in S80, whether the state of the switching request flag has been transitioned from cleared to set. Specifically, the control circuit 50 determines whether the energizing battery has been switched. The control circuit 50, if determining that the state of the switching request flag has been transitioned from cleared to set (S600: YES), proceeds to S610.

In S610, the control circuit 50 changes the output duty ratio of the PWM signal to 0%. In this step, the control circuit 50 temporarily sets the output duty ratio to 0% and stops energizing the motor 70 in order to execute a soft start.

The soft start is executed to gradually increase the rotational speed of the motor 70 until the output duty ratio reaches the target duty ratio, or the actual rotational speed reaches the target rotational speed. In the present embodiment, the control circuit 50 gradually increases the rotational speed of the motor 70 in the soft start until the output duty ratio reaches the target duty ratio.

In S610, if the control circuit 50 determines that the state of the switching request flag has not been transitioned from cleared to set (S600: NO), the control circuit 50 proceeds to S620. In S620, the control circuit 50 determines whether the switching request flag has been set. Specifically, the control circuit 50 determines whether rotation of the motor 70 that has been started or to be started is initiated by (i) manipulation of the drive switch 17 or (ii) switching of the energizing battery. In the case of (i) where rotation of the motor 70 initiated by manipulation of the drive switch 17 (hereinafter referred to as normal start), rotation of the motor 70 is started as intended by a user. In such a start where rotation of the motor 70 is started in accordance with the user's intention, the control circuit 50 executes the first soft start.

In contrast, in the case of (ii) where rotation of the motor 70 is initiated by switching of the energizing battery (hereinafter referred to as switching-initiated start), rotation of the motor 70 is started without the user's intention. Thus, in the case of the switching-initiated start, when the control circuit 50 executes the first soft start, a large change in the rotational speed occurs unexpectedly to a user, thereby making the user feel uncomfortable. Accordingly, in the case of the switching-initiated start, the control circuit 50 executes the second soft start. In the second soft start, in order to prevent a user from experiencing an uncomfortable feeling, the control circuit 50 increases the rotational speed more gradually than in the first soft start. That is, in the second soft start, the control circuit 50 controls a rate of increase in the rotational speed to be less than a rate of increase in the first soft start.

As can be seen in Table 1 of FIG. 9, each speed mode has an associated target duty ratio, and further has an associated increased duty ratio in the normal start and an associated increased duty ratio in the switching-initiated start. The increased duty ratios in switching-initiated starts are less than the increased duty ratios in normal starts in order to gradually increase the output duty ratio. Specifically, each increased duty ratio in the switching-initiated start is set to be a half of or less than the corresponding increased duty ratio in the normal start. Accordingly, a second rate of increase during execution of the second soft start is a half of or less than a first rate of increase during execution of the first soft start. The first rate of increase is a rate for increasing the rotational speed during execution of the first soft start, and the second rate of increase is a rate for increasing the rotational speed during execution of the second soft start.

In addition, the increased duty ratios in normal starts are constant irrespective of the speed mode. In contrast, the increased duty ratios in switching-initiated starts are specific to the respective speed modes. That is, in the switching-initiated start, the rate of increase in the rotational speed (namely, the second rate of increase) varies depending on the speed mode. Specifically, in the switching-initiated start, the increased duty ratios are set to be smaller as the rotational speed decreases in relation to the speed modes. In a case where the second rate of increase in the lower speed mode is equal to the second rate of increase in the higher speed mode, users are less likely to realize during the switching-initiated start in the lower speed mode that the rotational speed increases more gradually than in the first soft start. Thus, for switching-initiated starts in lower speed modes, the increased duty ratios are set to be smaller than the increased duty ratios for switching-initiated starts in higher speed modes so as to reduce the rate of increase in the rotational speed.

In S620, if the control circuit 50 determines that the switching request flag has not been set (S620: NO), the control circuit 50 proceeds to S630. The control circuit 50, if determining that the switching request flag has been set (S620: YES), proceeds to S640.

In S630, the control circuit 50 sets the increased duty ratio to an increased duty ratio for the normal start and proceeds to S650.

In S640, the control circuit 50 sets the increased duty ratio to the ratio for the switching-initiated start in accordance with the speed mode, and proceeds to S650.

In S650, the control circuit 50 adds the increased duty ratio set in S630 or S640 to the output duty ratio so as to update the output duty ratio.

Subsequently in S660, the control circuit 50 determines whether the output duty ratio updated in S650 is equal to or greater than the target duty ratio acquired in S90. The control circuit 50, if determining that the output duty ratio is less than the target duty ratio (S600. NO), outputs the control command based on the output duty ratio to the motor drive circuit 35, and proceeds to S20.

In S660, if the control circuit 50 determines that the output duty ratio is equal to or greater than the target duty ratio (S600: YES), the control circuit 50 proceeds to S670. In S670, the control circuit 50 sets the output duty ratio to the target duty ratio, and outputs the control command based on the output duty ratio to the motor drive circuit 35. In S680, the control circuit 50 clears the switching request flag and returns to S20.

1-4. Operation

In FIGS. 10 to 14 illustrate a first example to a fifth example of temporal variations in a value of voltage imposed on the motor 70 (motor voltage value), a first voltage value and a second voltage value when the motor drive process according to the present embodiment is executed.

1-4-1. First Example

Figure 10:
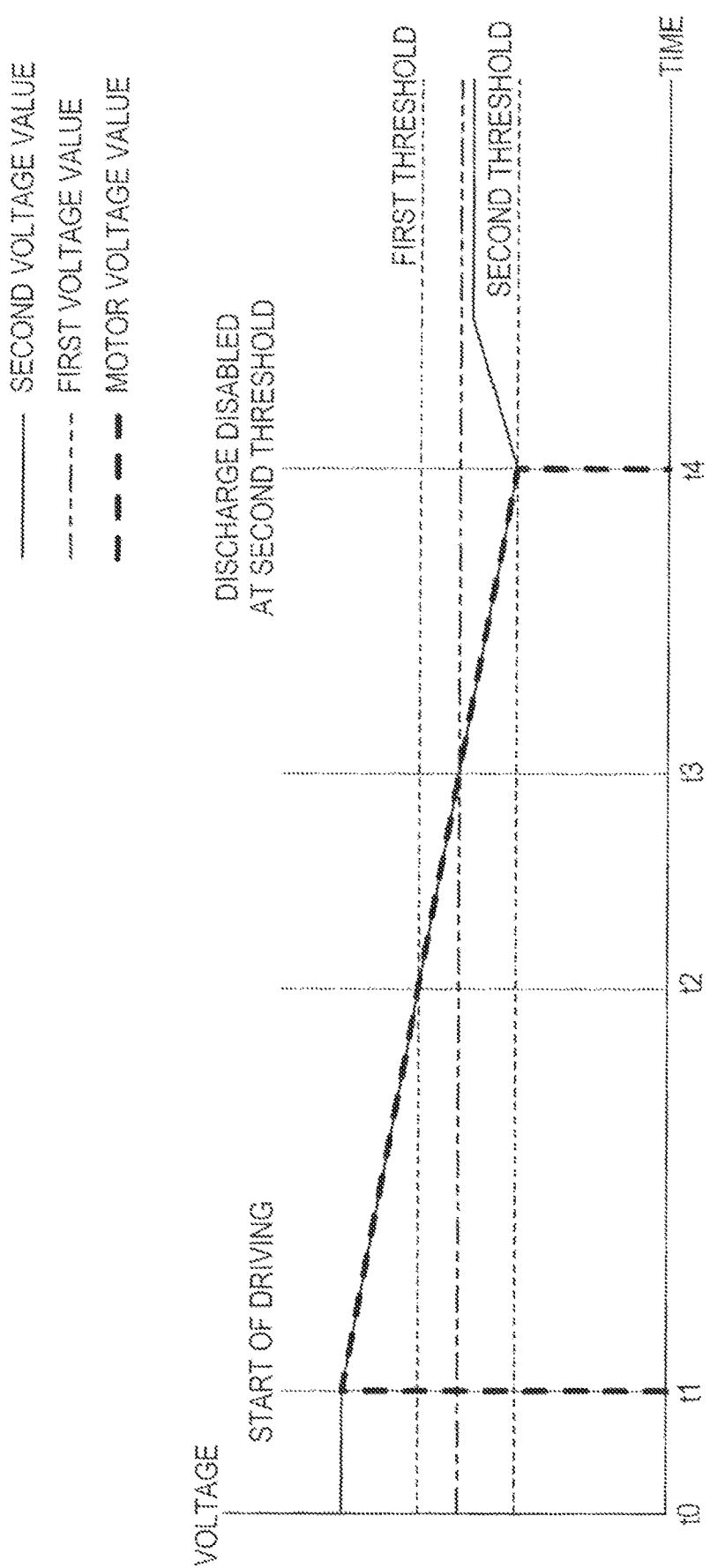
FIG. 10 is a time chart illustrating a first example of temporal variations in a motor voltage value, a first voltage value, and a second voltage value according to the first embodiment.

In a first example illustrated in FIG. 10, at time point t1, the drive switch 17 is manipulated to command to start rotation of the motor 70. At time point t1, the first voltage value is less than the first threshold, and the second voltage value is equal to or greater than the first threshold. Thus, the second battery 200B is selected. Accordingly, the second connector 210B is electrically connected to the motor 70, thereby enabling a start of power supply from the second battery 200B to the motor 70 and a start of driving of the motor 70.

As a current is discharged from the second battery 200B, the second voltage value gradually decreases. At time point t2, the second voltage value is less than the first threshold but is equal to or greater than the second threshold. Accordingly, discharge of the second battery 200B is continued.

At time point t3, the second voltage value is less than the first voltage value, but discharge of the second battery 200B is continued.

At time point t4, the second voltage value is less than the second threshold. It is thus not possible to continue discharge of the second battery 200B. At this point, since the first voltage value is less that the first threshold, there is no battery that is allowed to discharge. Accordingly, both the first and second switches 33A, 33B are turned OFF to stop driving the motor 70. The first example described above corresponds to a case where the control circuit 50, when determining in S370 that the non-energizing battery is not allowed to discharge, executes S400 without executing S390.

After discharge of the second battery 200B is stopped, the second voltage value is increased by the amount of voltage drop but does not exceed the second threshold. Thus, even if the drive switch 17 is manipulated at or after time point t4, rotation of the motor 70 is not restarted.

1-4-2. Second Example

Figure 11:
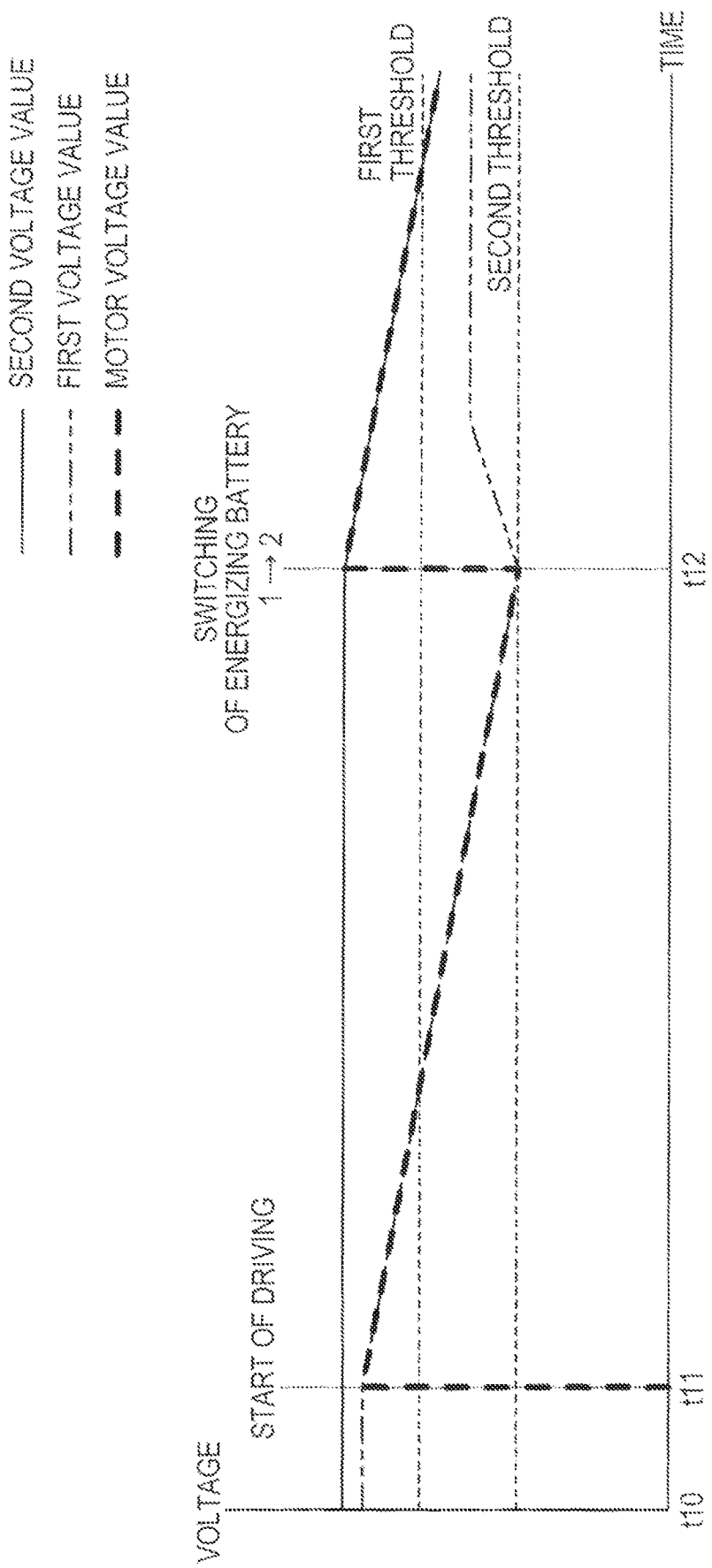
FIG. 11 is a time chart illustrating a second example of temporal variations in the motor voltage value, the first voltage value, and the second voltage value according to the first embodiment.

In a second example illustrated in FIG. 11, at time point t11, the drive switch 17 is manipulated to command to start rotation of the motor 70. At time point t11, the second voltage value is greater than the first voltage value, but the first voltage value is equal to or greater than the first threshold. Thus, the first battery 200A is selected in priority. Accordingly, the first connector 210A is electrically connect to the motor 70, thereby enabling a start of power supply from the first battery 200A to the motor 70 and a start of driving of the motor 70.

As a current is discharged from the first battery 200A, the first voltage value gradually decreases. At time point t12, the first voltage value is less than the second threshold. It is thus not possible to continue discharge of the first battery 200A. At this point, since the second voltage value is equal to or greater than the first threshold, the second battery 200B is allow to discharge. Accordingly, at time point t2, the energizing battery is changed from the first battery 200A to the second battery 200B, thereby enabling a start of power supply from the second battery 200B to the motor 70 to continue driving of the motor 70.

1-4-3. Third Example

Figure 12:
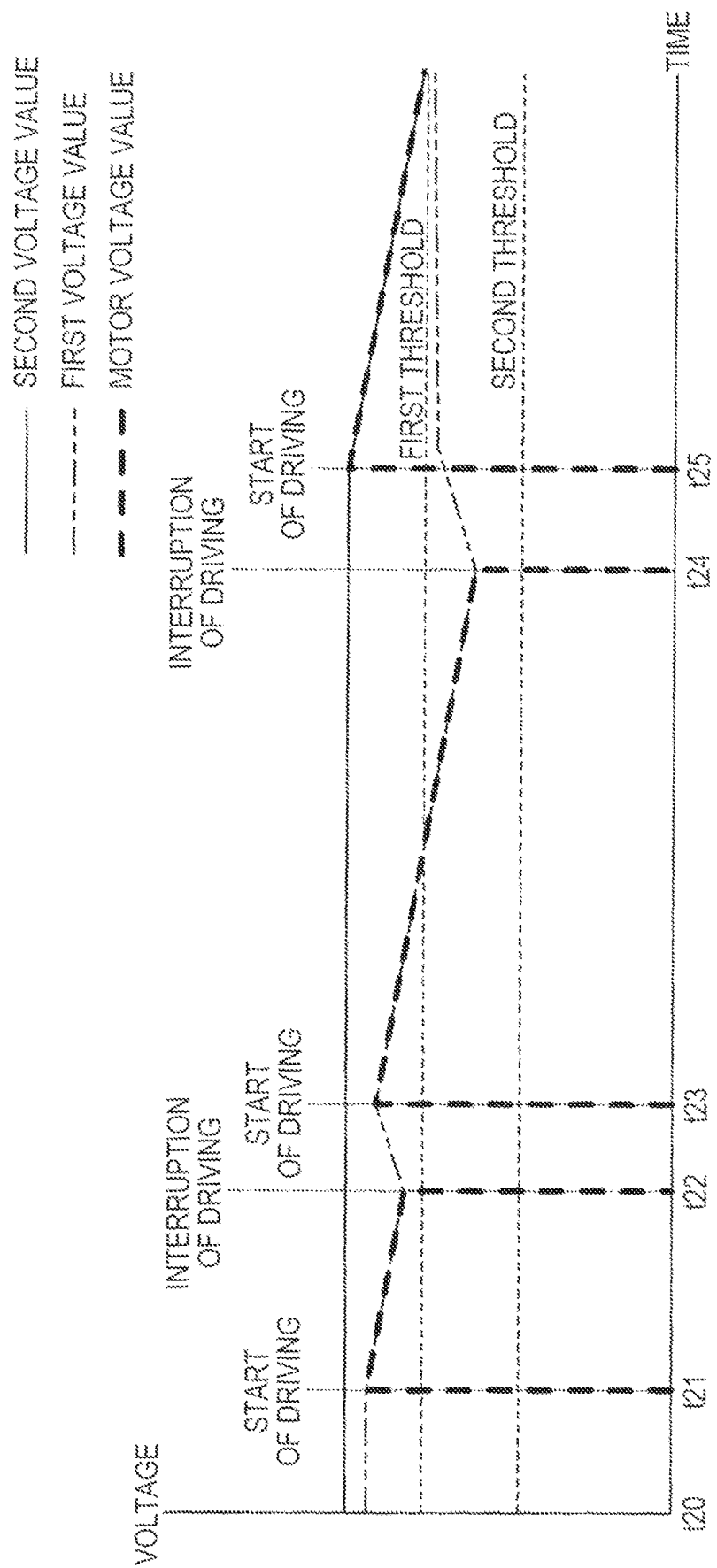
FIG. 12 is a time chart illustrating a third example of temporal variations in the motor voltage value, the first voltage value, and the second voltage value according to the first embodiment.

In a third example illustrated in FIG. 12, at time point t21, the drive switch 17 is manipulated to command to start rotation of the motor 70. At time point t21, the second voltage value is greater than the first voltage value, but the first voltage value is equal to or greater than the first threshold. Thus, the first battery 200A is selected in priority. Accordingly, the first connector 210A is electrically connected to the motor 70, thereby enabling a start of power supply from the first battery 200A to the motor 70 and start of driving of the motor 70.

As a current is discharged from the first battery 200A, the first voltage value gradually decreases. At time point t22, the drive switch 17 is manipulated to command to stop driving of the motor 70. This stops discharge of the first battery 200A, thereby interrupting driving of the motor 70. After discharge from the first battery 200A is stopped, the first voltage value increases.

At time point t23, the drive switch 17 is manipulated to command to restart rotation of the motor 70. At this point, the first voltage value is equal to or greater than the first threshold. Accordingly, discharge of the first battery 200A is continued. With electric power supplied from the first battery 200A, driving of the motor 70 is started.

At time point t24, the drive switch 17 is manipulated to command to stop driving of the motor 70. Accordingly, discharge of the first battery 200A is stopped to thereby interrupt driving of the motor 70. After discharge of the first battery 200A is stopped, the first voltage value increases.

At time point t25, the drive switch 17 is manipulated to command to restart rotation of the motor 70. At this point, the first voltage value is less than the first threshold, and the second voltage value is equal to or greater than the first threshold. Thus, the second battery 200B is selected. Accordingly, the second connector 210B is electrically connected to the motor 70, thereby enabling a start of power supply from the second battery 200B to the motor 70 and a start of driving of the motor 70.

1-4-4. Fourth Example

Figure 13:
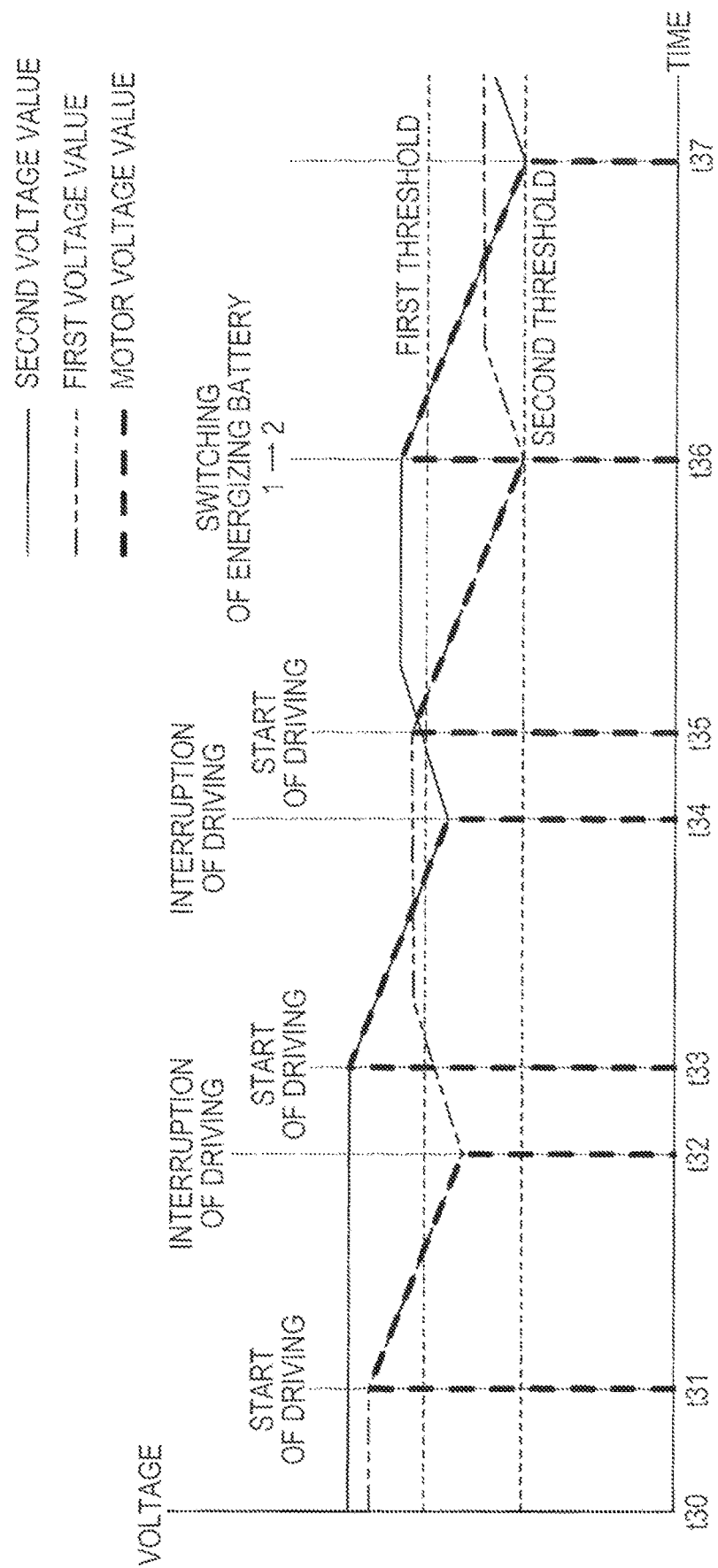
FIG. 13 is a time chart illustrating a fourth example of temporal variations in the motor voltage value, the first voltage value, and the second voltage value according to the first embodiment.

In a fourth example illustrated in FIG. 13, at time point t31, the drive switch 17 is manipulated to command to start rotation of the motor 70. At time point 31, the second voltage value is greater than the first voltage value, but the first voltage value is equal to or greater than the first threshold. Thus, the first battery 200A is selected in priority. Accordingly, the first connector 210A is electrically connected to the motor 70, thereby enabling a start of power supply from the first battery 200A to the motor 70 and a start of driving of the motor 70.

As a current is discharged from the first battery 200A, the first voltage value gradually decreases. At time point t32, the drive switch 17 is manipulated to command stop driving of the motor 70. This stops discharge of the first battery 200A, thus interrupting driving of the motor 70. After discharge of the first battery 200A is stopped, the first voltage value increases.

At time point t33, the drive switch 17 is manipulated to command to restart rotation of the motor 70. At this point, the first voltage value is less than the first threshold, and the second voltage value is equal to or greater than the first threshold. Thus, the second battery 200B is selected. Accordingly, the second connector 210B is electrically connected to the motor 70, thereby enabling a start of power supply from the second battery 200B to the motor 70 and a start of rotation of the motor.

As a current discharged from the second battery 200B, the second voltage value gradually decreases. At time point t34, the drive switch 17 is manipulated to command to stop driving of the motor 70. This stops discharge of the second battery 200B, thereby interrupting driving of the motor 70. After discharge of the second battery 200B is stopped, the second voltage value increases.

At time point t35, the drive switch 17 is manipulated to command to restart rotation of the motor 70. At this point, both the first voltage value and the second voltage value have increased to values equal to or greater than the first threshold. Thus, the first battery 200A is selected in priority. Accordingly, the first connector 210A is electrically connected to the motor 70, thereby enabling a start of power supply from the first battery 200A to the motor 70 and a start of driving of the motor 70.

As a current is discharged from the first battery 200A, the first voltage value gradually decreases. At time point t36, the first voltage value is less than the second threshold. Thus, it is not possible to continue discharge of the first battery 200A. At this point, the second voltage value is equal to or greater than the first threshold. Thus, the second battery 200B is allowed to discharge. Accordingly, at time point t36, the energizing battery is changed from the first battery 200A to the second battery 200B, thereby enabling a start of power supply from the second battery 200B to the motor 70 and a start of driving of the motor 70.

At time point t37, the second voltage value is less than the second threshold. Thus, it is not possible to continue discharge of the second battery 200B. At this point, since the first voltage value is less than the first threshold, there is no battery that is allowed to discharge. Accordingly, both the first and second switches 33A, 33B are turned OFF to stop driving of the motor 70. The fourth example corresponds to a case where the control circuit 50, when determining in S370 that the non-energizing battery is not allowed to discharge, executes S400 without executing S390.

1-4-5. Fifth Example

Figure 14:
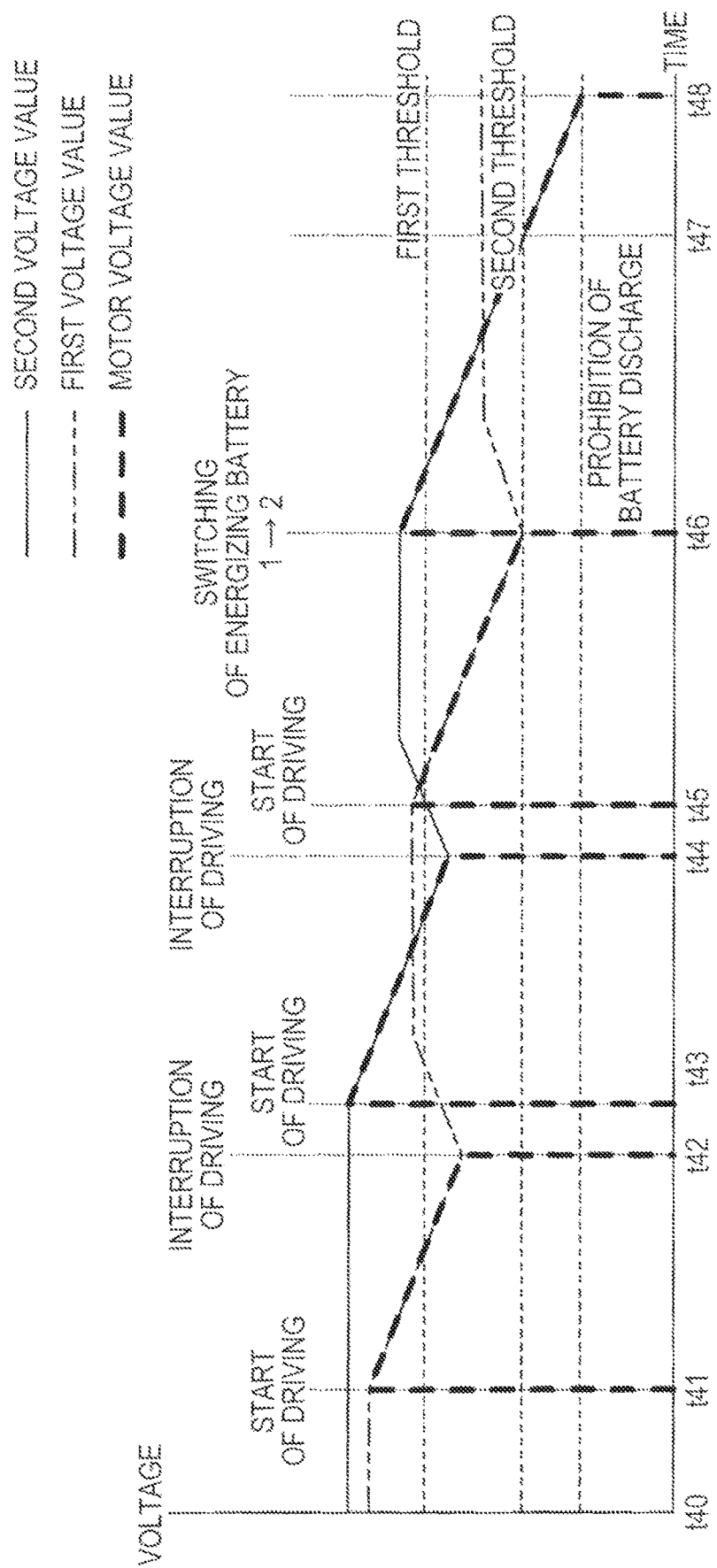
FIG. 14 is a time chart illustrating a fifth example of temporal variations in the motor voltage value, the first voltage value, and the second voltage value according to the first embodiment.

In a fifth example illustrated in FIG. 14, in a period from time point t41 to time point t46, the electric work machine 100 behaves in the same manner as in a period from time point t31 to time point t36 of the fourth example.

At time point t47, the second voltage value is less than the second threshold. Thus, it is not possible to continue discharge of the second battery 200B. At this point, since the second voltage value is less than the first threshold, there is no battery that is allowed to discharge. Accordingly, the control circuit 50 continues discharge of the second battery 200B until receipt of a discharge prohibition signal from the second battery 200B.

At time point t48, the control circuit 50, based on a discharge prohibition signal received from the second battery 200B, stops discharge of the second battery 200B. Specifically, the control circuit 50 turns OFF both the first and second switches 33A, 33B. This stops driving of the motor 70. The fifth example corresponds to a case where the control circuit 50, when determining in S370 that the non-energizing battery is not allowed to discharge, executes S390.

1-5. Effects

The first embodiment described above in detail achieves the following effects.

(1) The electric work machine 100 has the first threshold and the second threshold. The first threshold is used for determining whether the first and second batteries 200A, 200B are allowed to discharge. The second threshold is used for determining whether to stop discharge the energizing battery. Accordingly, even if the voltage value of the energizing battery falls below the first threshold immediately after a start of rotation of the motor 70, the energizing battery is not changed. Thus, this configuration can inhibit a change of the energizing battery immediately after a start of rotation of the motor 70.

(2) The first connector 210A is electrically connected to the motor 70 in priority. This configuration enables a user to determine, when the energizing battery is changed, which one of the first battery 200A or the second battery 200B should be charged.

(3) The load on the motor 70 and the amount of voltage drop in the first and second batteries 200A, 200B vary depending on the speed mode. Accordingly, the first threshold and/or the second threshold are changed in accordance with the speed mode. This configuration allows lowering of the first threshold and/or the second threshold, in a case where the amount of voltage drop is relatively low, so that the discharge capacities of the first and second batteries 200A, 200B can be increased. This configuration thus can increase the work amount of the electric work machine 100 per charge of the first and second batteries 200A, 200B.

(4) Discharge of the energizing battery is stopped when the control circuit 50 receives a discharge prohibition signal from the energizing battery. Thus, it is possible to immediately protect the energizing battery upon an occurrence of a failure of the energizing battery.

(5) If there is no battery allowed to discharge when the voltage value of the energizing battery falls below the second threshold, discharge of the energizing battery is continued until the control circuit 50 receives a discharge prohibition signal from the energizing battery. This configuration can inhibit a run time of the motor 70 from being reduced during continuous driving of the motor 70.

(6) In a case where discharge of the first and second batteries 200A, 200B is prohibited at voltage values that are set in accordance with the type of the first and second batteries 200A, 200B, a user experiences an uncomfortable feeling. Use of the second threshold can prevent the user from experiencing such an uncomfortable feeling.

2. Second Embodiment

2-1. Differences from First Embodiment

A second embodiment has the same basic configuration as in the first embodiment, and thus differences from the first embodiment will be described below. The same reference numerals as in the first embodiment indicate the same configurations. For such configurations, the earlier descriptions should be referred to.

In the above-described first embodiment, the rotational speed of the motor 70 is controlled without feedback. Contrary to the first embodiment, feedback control is executed in the second embodiment to control the rotational speed of the motor 70. Specifically, in the second embodiment, the motor output process in the motor driving process illustrated in FIG. 4 is distinct from the first embodiment.

Figure 4:
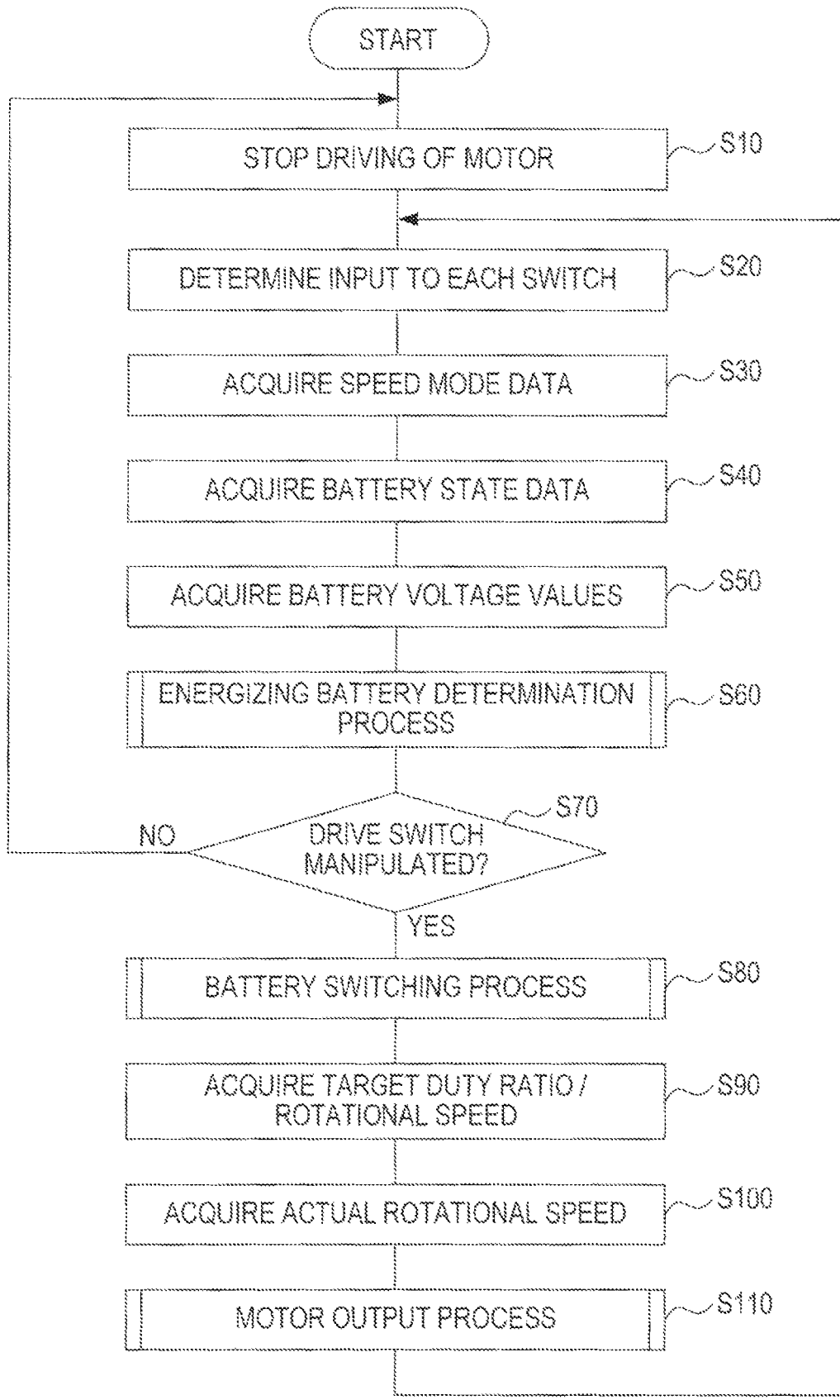
FIG. 4 is a flow chart of a motor control process according to the first embodiment.

Furthermore, in the second embodiment, the target rotational speed is acquired in S90 of the motor driving process illustrated in FIG. 4. As illustrated in FIG. 16, Table 3 defining a relationship of each speed mode with the target rotational speed is prepared in advance and stored in the ROM 50b. In S90, the control circuit 50 acquires the target rotational speed based on the speed mode set via the speed setter 12 and Table 3.

2-2. Motor Output Process

Figure 15A:
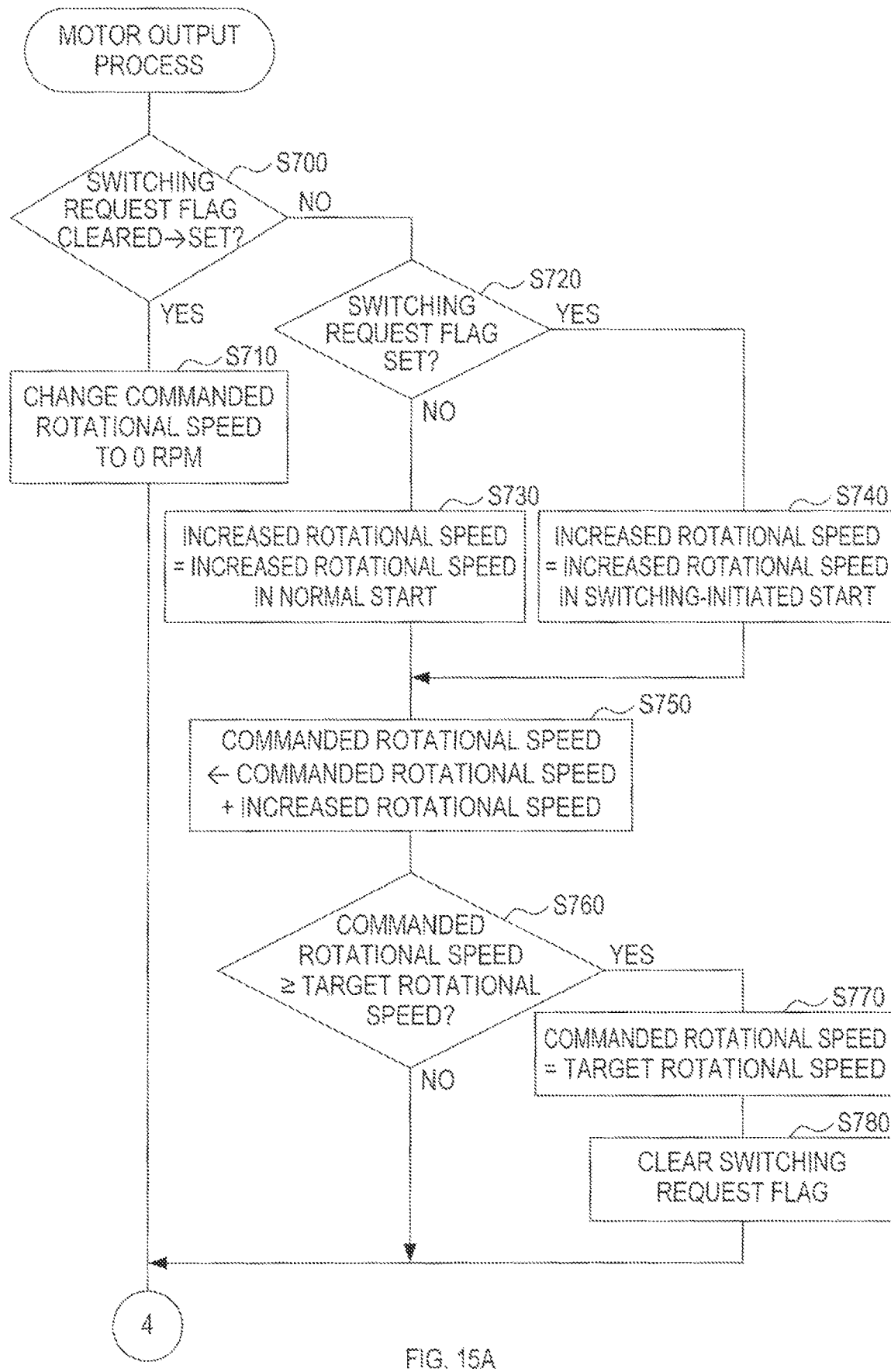
FIG. 15A is a flow chart of one part of motor output process according to a second embodiment.
Figure 15B:
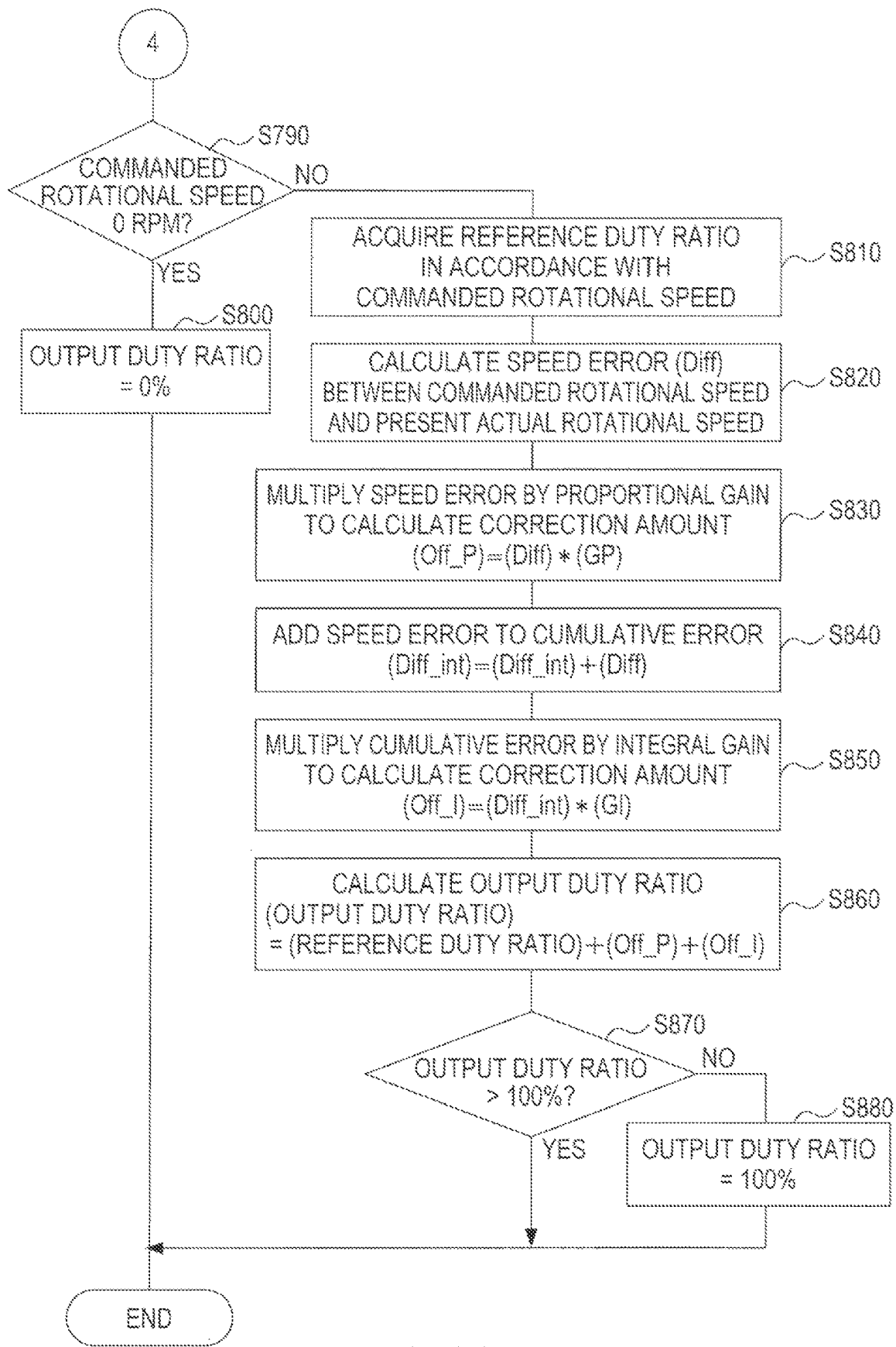
FIG. 15B is a flow chart of the remainder part of the motor output process according to the second embodiment.

Next, a motor output process executed by the control circuit 50 in S110 will be described with reference to a flow chart in FIGS. 15A and 15B.

In S700, the control circuit 50 determines, based on the result of the battery switching process in S80, whether the state of the switching request flag has been transitioned from cleared to set. The control circuit 50, if determining that the state of the switching request flag has been transitioned from cleared to set (S700: YES), proceeds to S710.

In S710, the control circuit 50 changes a commanded rotational speed to 0 rpm. In this step, the control circuit 50 temporarily sets the commanded rotational speed to 0 rpm, thereby stopping the motor 70 so as to execute the soft start.

In S710, if the control circuit 50 determines that the state of the switching request flag has not transitioned from cleared to set (S700: NO), the control circuit 50 proceeds to S720. In S720, the control circuit 50 determines whether the switching request flag has been set. Specifically, the control circuit 50 determines whether rotation of the motor 70 that has been started or to be started is initiated by the normal start or the switching-initiated start.

As can be seen in Table 3 of FIG. 16, each speed mode has an associated target rotational speed, and further has an associated increased rotational speed in the normal start and an associated increased rotational speed in the switching-initiated start. The increased rotational speeds in switching-initiated starts are lower than the increased rotational speeds in normal starts in order to gradually increase the commanded rotational speed. Specifically, each increased rotational speed in the switching-initiated start is set to be a half of or lower than the corresponding increased rotational speed in the normal start. Accordingly, the second rate of increase during execution of the second soft start is a half of or less than the first rate of increase during execution of the first soft start. The commanded rotational speed is a command value for the rotational speed of the motor 70.

In addition, the increased rotational speeds in normal starts are constant irrespective of the speed mode. In contrast, the increased rotational speeds in the switching-initiated start are specific to the respective speed modes. That is, in the switching-initiated start, the rate of increase in rotational speed varies depending on the speed mode. Specifically, in the switching-initiated start, the increased rotational speeds are set to be smaller as the rotational speed decreases in relation to the speed modes.

In S720, if the control circuit 50 determines that the switching request flag has not been set (S720: NO), the control circuit 50 proceeds to S730. The control circuit 50, if determining that the switching request flag has been set (S720: YES), proceeds to S740.

In S730, the control circuit 50 sets the increased rotational speed to an increased rotational speed for the normal start and proceeds to S750.

In S740, the control circuit 50 sets the increased rotational speed to the speed for the switching-initiated start in accordance with the speed mode, and proceeds to S750.

In S750, the control circuit 50 adds the increased rotational speed set in S730 or S740 to the present commanded rotational speed so as to update the commanded rotational speed.

Subsequently in S760, the control circuit 50 determines whether the commanded rotational speed updated in S750 is equal to or higher than the target rotational speed acquired in S90. The control circuit 50, if determining that the commanded rotational speed is lower than the target rotational speed (S760: NO), proceeds to S790.

In S760, if the control circuit 50 determines that the commanded rotational speed is equal to or higher than the target rotational speed (S760. YES), the control circuit 50 proceeds to S770. In S770, the control circuit 50 sets the commanded rotational speed to the target rotational speed. In S780, the control circuit 50 clears the switching request flag and proceeds to S790.

In S790, the control circuit 50 determines whether the commanded rotational speed is 0 rpm. The control circuit 50, if determining that the commanded rotational speed is 0 rpm (S790: YES), proceeds to S800. In S800, the control circuit 50 sets the output duty ratio to 0%, outputs the control command in accordance with the output duty ratio to the motor drive circuit 35, and proceeds to S20.

In S790, if the control circuit 50 determines that the commanded rotational speed is not 0 rpm (S790: NO), the control circuit 50 proceeds to S810.

In S810, the control circuit 50 acquires a reference duty ratio associated with the present commanded rotational speed. As illustrated in FIG. 17, Table 4 defining a relationship of each commanded rotational speed with the reference duty ratio is prepared in advance and stored in the ROM 50*b*. In S810, the control circuit 50 acquires the reference duty ratio based on the commanded rotational speed and Table 4.

In S820, the control circuit 50 calculates a speed error Diff between the commanded rotational speed and the actual rotational speed acquired in S100.

In S830, the control circuit 50 multiplies the speed error Diff calculated in S820 by a proportional gain GP to calculate a proportional correction amount Off_P.

In S840, the control circuit 50 adds the speed error Diff calculated in S830 to a cumulative error Diff_int to update the cumulative error Diff_int.

In S850, the control circuit 50 multiplies the cumulative error Diff_int updated in S840 by an integral gain GI to calculate an integral correction amount Off_I.

In S860, the control circuit 50 adds the proportional correction amount Off_P calculated in S830 and the integral correction amount Off_I calculated in S850 to the reference duty ratio acquired in S810 to calculate the output duty ratio.

In S870, the control circuit 50 determines whether the output duty ratio calculated in S860 is greater than 100%. The control circuit 50, if determining that the output duty ratio is 100% or smaller (S870: NO), outputs the control command based on the output duty ratio to the motor drive circuit 35 and returns to S20.

In S870, if the control circuit 50 determines that the output duty ratio is greater than 100% (S870: YES), the control circuit 50 proceeds to S880. In S880, the control circuit 50 sets the output duty to 100%, outputs the control command based on the duty ratio to the motor drive circuit 35, and returns to S20.

2-3. Effects

The second embodiment described above in detail achieves the same effects as the effects (1) through (5) of the first embodiment.

3. Other Embodiments

Embodiments of the present disclosure have been described hereinabove. However, the present disclosure should not be limited to the above-described embodiments and may be implemented in variously modified forms.

(a) The electric work machine 100 is described as a dust extractor in the embodiments described above. The electric work machine 100, however, is not limited to the dust extractor. Examples of the electric work machine 100 may include a blower, an electric power tool such as a hammer drill, and a gardening tool such as a grass cutter.

(b) Functions of one component in the above-described embodiments may be achieved by two or more components, and a function of one component may be achieved by two or more components. Furthermore, functions of two or more components may be achieved by one component, and a function achieved by two or more components may be achieved by one component. Some of the components of the above-described embodiments may be optional. At least some of the configurations of the above-described embodiments may be added to or replaced with other configurations of the above-described embodiments.

What is claimed is:

1. A dust extractor comprising:
   a body with a hose attachment port;
   a first connector in the body and configured to be connected to a first battery having a first voltage value;
   a second connector in the body and configured to be connected to a second battery having a second voltage value;
   a motor in the body;

a fan configured to be driven by the motor to thereby generate a suction force;
a drive circuit in the body and configured to be electrically connected to the motor;
a first connection line configured to connect the first connector to the drive circuit;
a second connection line configured to connect the second connector to the drive circuit;
a first switch on the first connection line;
a second switch on the second connection line;
a drive switch on the body and configured to be pressed by a user to command to start or stop rotation of the motor; and
a processor programmed to:
  detect the first voltage value and the second voltage value;
  receive a command via the drive switch to start rotation of the motor;
  turn off the first switch and turn on the second switch based on the first voltage value below a first threshold;
  turn on the first switch and turn off the second switch based on the first voltage value equal to or greater than the first threshold;
  maintain the first switch on and the second switch off based on the first voltage value below the first threshold and equal to or greater than the second threshold during discharge of the first battery, the second threshold being less than the first threshold; and
  turn off the first switch and turn on the second switch based on the first voltage value having fallen below the second threshold during discharge of the first battery.

2. An electric work machine comprising:
a motor;
a first connector configured to be connected to a first battery having a first voltage value;
a second connector configured to be connected to a second battery having a second voltage value;
an energizing circuit configured to receive a first control signal to thereby selectively and electrically connect the first connector or the second connector to the motor;
a drive switch configured to be manually operated by a user to command to start or stop rotation of the motor; and
a controller configured to:
  detect the first voltage value and the second voltage value;
  receive a first command via the drive switch to start rotation of the motor;
  output the first control signal to the energizing circuit based on the first voltage value below the first threshold to thereby electrically disconnect the first connector from the motor;
  output the first control signal to the energizing circuit based on the first voltage value equal to or greater than the first threshold to thereby electrically connect the first connector to the motor;
  maintain an electrical connection of the first connector to the motor based on the first voltage value below the first threshold and equal to or greater than a second threshold during discharge of the first battery, the second threshold being less than the first threshold; and
  output the first control signal to the energizing circuit based on the first voltage value having fallen below the second threshold during discharge of the first battery so as to (i) electrically disconnect the first connector from the motor and (ii) electrically connect the second connector to the motor.

3. The electric work machine according to claim 2, wherein
the controller is configured to select the first connector rather than the second connector based on (i) receipt of the first command, (ii) the first voltage value equal to or greater than the first threshold, and (iii) the second voltage value equal to or greater than the first threshold to thereby electrically connect the first connector to the motor.

4. The electric work machine according to claim 2, further comprising a speed selector switch configured to be manually operated by a user to select a first mode or a second mode,
wherein the first mode has a first target rotational speed of the motor,
the second mode has a second target rotational speed distinct from the first target rotational speed, and
the controller is configured to change the first threshold and/or the second threshold in accordance with the first mode or the second mode selected via the speed selector switch.

5. The electric work machine according to claim 2, wherein
the first battery is configured to detect a failure of the first battery, and output a request for discharge prohibition to the first connector based on detection of the failure, and
the controller is configured to stop discharge of the first battery based on the request for discharge prohibition received via the first connector while the first connector is electrically connected to the motor.

6. The electric work machine according to claim 5, wherein
the controller continues discharge of the first battery based on (i) the first voltage value below the second threshold and (ii) the second voltage value below the first threshold, until receipt of the request for discharge prohibition via the first connector.

7. The electric work machine according to claim 2, further comprising:
a drive circuit (i) electrically connected to the motor and (ii) configured to drive the motor in accordance with a second control signal from the controller;
a first connection line configured to connect the first connector to the drive circuit; and
a second connection line configured to connect the second connector to the drive circuit,
wherein the energizing circuit includes:
  a first switch on the first connection line; and
  a second switch on the second connection line, and
the first switch and the second switch are configured to be turned on or off in accordance with the first control signal.

8. A method for supplying electric power to a motor of an electric work machine, the method comprising:
detecting a first voltage value of a first battery and a second voltage value of a second battery;
outputting a first control signal in response to the first voltage value being below a first threshold so as to electrically disconnect the first battery from the motor;

outputting the first control signal in response to the first voltage value being equal to or greater than the first threshold so as to electrically connect the first battery to the motor;

maintaining an electrical connection of the first battery to the motor in response to the first voltage value being below the first threshold and equal to or greater than a second threshold during discharge of the first battery; and outputting the first control signal in response to the first voltage value having fallen below the second threshold during discharge of the first battery so as to (i) electrically disconnect the first battery from the motor and (ii) electrically connect the second battery to the motor.

* * * * *